United States Patent
Kodera et al.

(10) Patent No.: US 11,964,665 B2
(45) Date of Patent: Apr. 23, 2024

(54) VEHICLE SPEED CALCULATING DEVICE AND CONTROL DEVICE FOR VEHICLE

(71) Applicants: JTEKT CORPORATION, Kariya (JP); TOYOTA JIDOSHA KABUSHIKI KAISHA, Toyota (JP)

(72) Inventors: Takashi Kodera, Okazaki (JP); Toru Takashima, Susono (JP); Koichi Nishimura, Gotemba (JP); Takahito Ishino, Numazu (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 17/683,610

(22) Filed: Mar. 1, 2022

(65) Prior Publication Data

US 2022/0289205 A1    Sep. 15, 2022

(30) Foreign Application Priority Data

Mar. 4, 2021    (JP) ................. 2021-034779

(51) Int. Cl.
*B60W 10/20* (2006.01)
*B60W 40/105* (2012.01)

(52) U.S. Cl.
CPC .......... *B60W 40/105* (2013.01); *B60W 10/20* (2013.01); *B60W 2520/26* (2013.01);
(Continued)

(58) Field of Classification Search
CPC ............... B60W 10/20; B60W 40/105; B60W 2520/26; B60W 2520/263; B60W 2520/266; B60W 2520/28
(Continued)

(56) References Cited

U.S. PATENT DOCUMENTS 5,109,694 A    5/1992  Yahagi et al.
5,190,360 A  *  3/1993  Sano ..................... B60T 8/1769
                                                          303/159
(Continued)

FOREIGN PATENT DOCUMENTS

EP    2 374 680 A1    10/2011
JP    2003-002223 A    1/2003
JP    2020-069862 A    5/2020

OTHER PUBLICATIONS

Jul. 29, 2022 Extended European Search Report issued in Patent Application No. 22159977.2.

*Primary Examiner* — Erick R Solis
(74) *Attorney, Agent, or Firm* — Oliff PLC

(57) ABSTRACT

A vehicle speed calculating device includes a vehicle speed calculating unit configured to calculate a control vehicle speed that is acquired by estimating a vehicle body speed that is a speed at which a vehicle is actually traveling, as a state variable used to control an onboard device configured to operate to realize various functions provided in the vehicle. The vehicle speed calculating unit is configured to include an extraction function of extracting at least one wheel speed acquired from at least one wheel that is assumed to be rotating in a state in which an influence causing a difference from the vehicle body speed is likely to be small, out of wheel speeds of a plurality of wheels, and a calculation function of calculating the control vehicle speed based on the at least one wheel speed extracted by the extraction function.

5 Claims, 7 Drawing Sheets

(52) U.S. Cl.
CPC . *B60W 2520/263* (2013.01); *B60W 2520/266* (2013.01); *B60W 2520/28* (2013.01)

(58) Field of Classification Search
USPC ............... 73/115.08; 701/41–44, 74, 75
See application file for complete search history.

(56) References Cited

U.S. PATENT DOCUMENTS

| | | | | |
|---|---|---|---|---|
| 5,286,097 A | * | 2/1994 | Myoi | B60T 8/17636 |
| | | | | 701/74 |
| 5,466,054 A | * | 11/1995 | Okazaki | B60T 8/17636 |
| | | | | 303/154 |
| 2020/0130737 A1 | | 4/2020 | Kodera | |

* cited by examiner

VEHICLE SPEED CALCULATING DEVICE AND CONTROL DEVICE FOR VEHICLE

CROSS-REFERENCE TO RELATED APPLICATION

This application claims priority to Japanese Patent Application No. 2021-034779 filed on Mar. 4, 2021, incorporated herein by reference in its entirety.

BACKGROUND

1. Technical Field

The disclosure relates to a vehicle speed calculating device and a control device for a vehicle.

2. Description of Related Art

Various functions which are provided in a vehicle include, for example, a function of turning the turning wheels of the vehicle. Japanese Unexamined Patent Application Publication No. 2020-69862 (JP 2020-69862 A) discloses a steer-by-wire steering system as a device for realizing a function of turning the turning wheels of a vehicle.

The steering system described in JP 2020-69862 A includes a control device that controls an operation of the steering system. Such a control device is configured to control the operation of the steering system based on a vehicle speed (hereinafter referred to as a "control vehicle speed") out of various kinds of information acquired from the vehicle. In the control device, the control vehicle speed is acquired as an average value of wheel speeds of the turning wheels acquired from front-wheel sensors provided in the vehicle.

SUMMARY

Here, the control vehicle speed acquired as described above is used for various kinds of control in the vehicle as well as control of the operation of the steering system in JP 2020-69862 A. A control vehicle speed that is generally acquired in a vehicle is acquired by estimating a vehicle body speed that is a speed at which the vehicle is actually traveling. Accordingly, the vehicle body speed and the control vehicle speed acquired by estimating the vehicle body speed may be different from each other depending on rotation states of wheels from which the control vehicle speed is acquired.

For example, a method of performing a filtering process at the time of acquisition of the control vehicle speed may be used to reduce a difference between the vehicle body speed and the control vehicle speed. This method is effective when the difference between the vehicle body speed and the control vehicle speed is relatively large, but this method decreases the ability to follow change of the control vehicle speed in various kinds of control in a vehicle using the control vehicle speed when the difference is relatively small. That is, there is a trade-off relationship between reducing the difference between the vehicle body speed and the control vehicle speed, and curbing a decrease in ability to follow the change of the control vehicle speed in various kinds of control in a vehicle using the control vehicle speed.

According to an aspect of the disclosure, there is provided a vehicle speed calculating device including a vehicle speed calculating unit configured to calculate a control vehicle speed that is acquired by estimating a vehicle body speed that is a speed at which a vehicle is actually traveling, as a state variable that is used to control an onboard device configure to operate to realize various functions provided in the vehicle. The vehicle speed calculating unit is configured to include an extraction function of extracting at least one wheel speed acquired from at least one wheel that is assumed to be rotating in a state in which an influence causing a difference from the vehicle body speed is likely to be small, out of a plurality of wheel speeds of a plurality of wheels, and a calculation function of calculating the control vehicle speed based on the at least one wheel speed extracted by the extraction function.

With this configuration, the at least one wheel speed is actively considered in calculating the control vehicle speed. The at least one wheel speed is acquired from the at least one wheel that is assumed to be rotating in the state in which the influence causing the difference from the vehicle body speed is likely to be small, out of the plurality of wheels rotating in a state in which there are large and small influences causing the differences from the vehicle body speed. This is realized by the extraction function of the vehicle speed calculating unit. Accordingly, the difference between the control vehicle speed calculated by the function of the vehicle speed calculating unit and the vehicle body speed is reduced such that the difference becomes small. That is, for example, the method of performing a filtering process at the time of acquisition of the control vehicle speed does not need to be employed to reduce the difference between the vehicle body speed and the control vehicle speed. In this case, it is possible to achieve both of reducing the difference between the vehicle body speed and the control vehicle speed and curbing a decrease in ability to follow the change of the control vehicle speed in various kinds of control in the vehicle using the control vehicle speed.

Here, a wheel speed acquired from a wheel in a slip state in which the wheel idles relative to the ground contact surface as a rotation state of the wheel is likely to be larger than a wheel speed acquired from a wheel that is not in the slip state, and there is a high likelihood that the wheel speed acquired from the wheel in the slip state is different from the vehicle body speed. On the other hand, there is a low likelihood that a wheel speed, which is classified as a small value when the values of the plurality of wheel speeds are classified according to the magnitudes thereof, is a value acquired from a wheel in a slip state.

Therefore, in the vehicle speed calculating device according to the aspect, the extraction function may be configured to extract at least one wheel speed that is classified as at least one small value when values of the plurality of wheel speeds are classified according to magnitudes thereof.

With this configuration, for example, even when the plurality of wheels includes a wheel in the slip state, at least one wheel speed acquired from at least one wheel that is not in the slip state can be actively considered in calculating the control vehicle speed. This is effective for reducing the difference between the vehicle body speed and the control vehicle speed.

Here, a wheel speed acquired from a wheel in a locked state as a rotation state of the wheel is likely to be smaller than a wheel speed acquired from a wheel that is not in a locked state, and there is a high likelihood that the wheel speed acquired from the wheel in the locked state is different from the vehicle body speed. On the other hand, at least one wheel that is less likely to fall into a locked state out of the plurality of wheels is determined in design of the vehicle in advance.

Therefore, in the vehicle speed calculating device according to the aspect, the extraction function may be configured to extract at least one wheel speed of at least one wheel that is determined in design of the vehicle to be less likely to fall into a locked state, the locked state of each of the plurality of wheels being a state in which the wheel does not rotate relative to a ground contact surface even when the vehicle is traveling.

With this configuration, for example, even when the plurality of wheels includes a wheel in the locked state, at least one wheel speed acquired from at least one wheel that is not in the locked state can be actively considered in calculating the control vehicle speed. This is effective for reducing the difference between the vehicle body speed and the control vehicle speed.

In the vehicle speed calculating device according to the aspect, the extraction function may include a first extraction function of extracting the at least one wheel speed that is classified as the at least one small value when the values of the plurality of wheel speeds are classified according to the magnitudes thereof and a second extraction function of extracting the at least one wheel speed of the at least one wheel that is determined in the design of the vehicle to be less likely to fall into the locked state. The vehicle speed calculating unit may be configured to calculate the control vehicle speed based on at least one of a first vehicle speed that is acquired based on the at least one wheel speed extracted by the first extraction function and a second vehicle speed that is acquired based on the at least one wheel speed extracted by the second extraction function.

With this configuration, for example, the control vehicle speed can be calculated based on the first vehicle speed when there is assumed to be a wheel in the slip state, and the control vehicle speed can be calculated based on the second vehicle speed when there is assumed to be a wheel in the locked state. Accordingly, it is possible to effectively reduce a difference between the vehicle body speed and the control vehicle speed.

In the vehicle speed calculating device according to the aspect, the vehicle speed calculating unit may be configured to further include a vehicle speed distributing function of summing a plurality of vehicle speeds including the first vehicle speed acquired by the first extraction function and the second vehicle speed acquired by the second extraction function at predetermined distribution proportions. The vehicle speed distributing function may include a function of changing the distribution proportions according to an accelerating-decelerating state of the vehicle and a function of gradually changing the distribution proportions at a time of changing the distribution proportions.

With this configuration, since a likelihood that a wheel falls into the slip state or the locked state changes according to the accelerating-decelerating state of the vehicle, the distribution proportions are thus changed according to the accelerating-decelerating state of the vehicle. When the distribution proportions are actually changed, the control vehicle speed that is acquired as a result of calculation may change suddenly between before and after the change of the distribution proportions. With the above-described configuration, even when the distribution proportions are changed, it is possible to curb sudden change of the control vehicle speed acquired as the result of calculation between before and after the change of the distribution proportions.

The vehicle speed calculating device according to the aspect may be used for a control device for a vehicle, the control device being configured to control an operation of the onboard device using the control vehicle speed acquired by the vehicle speed calculating device. In this case, it is possible to provide the control device for a vehicle that can achieve both of reducing the difference between the vehicle body speed and the control vehicle speed and curbing a decrease in ability to follow the change of the control vehicle speed in various kinds of control in the vehicle using the control vehicle speed.

With the vehicle speed calculating device and the control device for a vehicle according to the aspect of the disclosure, it is possible to achieve both of reducing the difference between the vehicle body speed and the control vehicle speed and curbing a decrease in ability to follow the change of the control vehicle speed in various kinds of control in the vehicle using the control vehicle speed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
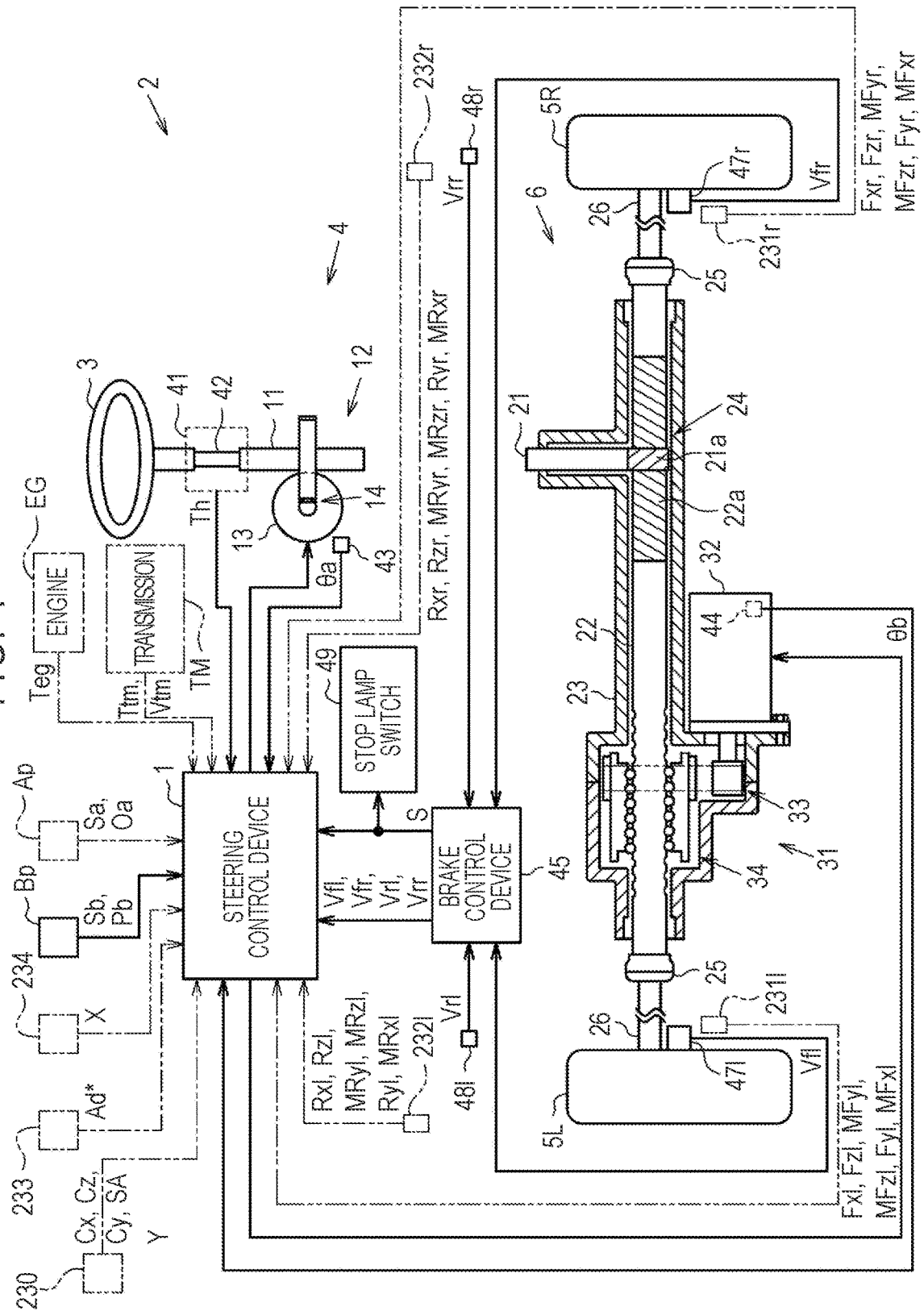
FIG. 1 is a diagram schematically illustrating a configuration of a steer-by-wire steering system.

A vehicle speed calculating device and a control device for a vehicle according to a first embodiment will be described below with reference to the accompanying drawings. As illustrated in FIG. 1, a steering system 2 according to this embodiment is configured as a steer-by-wire steering system. The steering system 2 includes a steering control device 1 that is a control device for a vehicle, and that is configured to control the operation of the steering system 2. The steering system 2 includes a steering mechanism 4 that is steered by a driver using a steering wheel 3 and a turning mechanism 6 that turns right and left turning wheels 5R and 5L according to a steering operation that is input to the steering mechanism 4 by a driver. The turning wheels 5R and 5L are right and left front wheels which are disposed on a front side of the vehicle. The steering system 2 according to this embodiment has a structure in which a power transmission path between the steering mechanism 4 and the turning mechanism 6 is normally mechanically cut off. In this embodiment, the steering system 2, that is, the steering mechanism 4 and the turning mechanism 6, is/are an example of an onboard device configured to operate to realize various functions provided in the vehicle.

The steering mechanism 4 includes a steering shaft 11 and a steering-side actuator 12. The steering shaft 11 is connected to a steering wheel 3. The steering-side actuator 12 includes a steering-side motor 13 and a speed reduction mechanism 14. The steering-side motor 13 applies a steering reaction force, which is a force against steering, to the steering wheel 3 via the steering shaft 11. The steering-side motor 13 is connected to the steering shaft 11, for example, via the speed reduction mechanism 14 including a worm and wheel.

The turning mechanism 6 includes a first pinion shaft 21, a rack shaft 22 that is a turning shaft, and a rack housing 23. The first pinion shaft 21 and the rack shaft 22 are connected with a predetermined crossing angle. A rack and pinion mechanism 24 is configured by causing pinion teeth 21a formed in the pinion shaft 21 and rack teeth 22a formed in the rack shaft 22 to engage with each other. That is, the pinion shaft 21 is an example of a rotation shaft of which a rotation angle can be converted to a turning angle of the turning wheels 5R and 5L. The rack housing 23 accommodates the rack and pinion mechanism 24. One end of the pinion shaft 21 opposite to the side connected to the rack shaft 22 protrudes from the rack housing 23. Both ends of the rack shaft 22 respectively protrude from both ends of the rack housing 23 in the axial direction. Tie rods 26 are respectively connected to the ends of the rack shaft 22 via rack ends 25 each of which is formed of a ball joint. The distal ends of the tie rods 26 are respectively connected to knuckles (not illustrated) to which the right and left turning wheels 5R and 5L are respectively assembled.

The turning mechanism 6 includes a turning-side actuator 31. The turning-side actuator 31 includes a turning-side motor 32, a transmission mechanism 33, and a conversion mechanism 34. The turning-side motor 32 applies a turning force for turning the turning wheels 5R and 5L to the rack shaft 22 via the transmission mechanism 33 and the conversion mechanism 34. The turning-side motor 32 transmits rotation to the conversion mechanism 34 via the transmission mechanism 33 formed of, for example, a belt transmission mechanism. The transmission mechanism 33 converts the rotation of the turning-side motor 32 to reciprocation of the rack shaft 22 via the conversion mechanism 34 formed of, for example, a ball screw mechanism.

In the steering system 2 having the aforementioned configuration, a motor torque is applied as a turning force from the turning-side actuator 31 to the rack shaft 22 according to a driver's operation on the steering wheel, whereby the turning angle of the turning wheels 5R and 5L is changed. At this time, a steering reaction force which is a force against the driver's steering is applied to the steering wheel 3 from the steering-side actuator 12. That is, in the steering system 2, a steering torque Th required for steering the steering wheel 3 is changed by the steering reaction force which is the motor torque applied from the steering-side actuator 12.

The reason why the pinion shaft 21 is provided is that the rack shaft 22 is supported along with the pinion shaft 21 in the rack housing 23. That is, by a support mechanism (not illustrated) which is provided in the steering system 2, the rack shaft 22 is supported to be movable in an axial direction thereof and is pressed toward the pinion shaft 21. Accordingly, the rack shaft 22 is supported in the rack housing 23.

Another support mechanism that supports the rack shaft 22 in the rack housing 23 without using the first pinion shaft 21 may be provided.

Electrical Configuration of Steering System 2

As illustrated in FIG. 1, the steering-side motor 13 and the turning-side motor 32 are connected to the steering control device 1. The steering control device 1 controls operations of the motors 13 and 32 by controlling supply of currents which are control values for the motors 13 and 32.

A torque sensor 41, a steering-side rotation angle sensor 43, and a turning-side rotation angle sensor 44 are connected to the steering control device 1. The torque sensor 41 detects a steering torque Th which is a value indicating a torque applied to the steering shaft 11 according to a driver's steering. The torque sensor 41 is provided on the steering shaft 11 at a position closer to the steering wheel 3 than the speed reduction mechanism 14 is. The torque sensor 41 detects the steering torque Th based on an amount of torsion of a torsion bar 42 which is provided in an intermediate portion of the steering shaft 11. For example, the steering torque Th is detected as a positive value when steering to the right is performed and is detected as a negative value when steering to the left is performed.

The steering-side rotation angle sensor 43 detects a rotation angle $\theta a$ which is an angle of a rotation shaft of the steering-side motor 13 as an angle in a range of 360°. The steering-side rotation angle sensor 43 is provided in the steering-side motor 13. The rotation angle $\theta a$ of the steering-side motor 13 is used to calculate a steering angle $\theta s$. The steering-side motor 13 and the steering shaft 11 operate in conjunction with each other via the speed reduction mechanism 14. Accordingly, the rotation angle $\theta a$ of the steering-side motor 13 and a rotation angle of the steering shaft 11 or the steering angle $\theta s$ which is a rotation angle of the steering wheel 3 have a correlation. Accordingly, the steering angle $\theta s$ can be calculated based on the rotation angle $\theta a$ of the steering-side motor 13. For example, the rotation angle $\theta a$ is detected as a positive value when steering to the right is performed and is detected as a negative value when steering to the left is performed.

The turning-side rotation angle sensor 44 detects a rotation angle $\theta b$ which is an angle of a rotation shaft of the turning-side motor 32 as an angle in the range of 360°. The turning-side rotation angle sensor 44 is provided in the turning-side motor 32. The rotation angle $\theta b$ of the turning-side motor 32 is used to calculate a pinion angle $\theta p$. The turning-side motor 32 and the pinion shaft 21 operate in conjunction with each other via the transmission mechanism 33, the conversion mechanism 34, and the rack-and-pinion mechanism 24. Accordingly, the rotation angle $\theta b$ of the turning-side motor 32 and the pinion angle $\theta p$ which is a rotation angle of the pinion shaft 21 have a correlation. Accordingly, the pinion angle $\theta p$ can be calculated based on the rotation angle $\theta b$ of the turning-side motor 32. The pinion shaft 21 engages with the rack shaft 22. Accordingly, the pinion angle $\theta p$ and an amount of movement of the rack shaft 22 have a correlation. That is, the pinion angle $\theta p$ is a value in which a state of the turning mechanism 6 that is a turning angle of the turning wheels 5R and 5L is reflected. The rotation angle $\theta b$ is detected as a positive value when steering to the right is performed and is detected as a negative value when steering to the left is performed.

A brake control device 45 is connected to the steering control device 1 via an onboard network such as CAN which is not illustrated. The brake control device 45 is provided in the vehicle separately from the steering control device 1. The brake control device 45 controls an operation of a brake device (not illustrated) mounted in the vehicle. A front-left wheel speed sensor 47*l* and front-right wheel speed sensor 47*r* are connected to the brake control device 45.

The front-left wheel speed sensor 47*l* detects a front-left wheel speed Vfl of the turning wheel 5L which is a front-left wheel. The front-right wheel speed sensor 47*r* detects a front-right wheel speed Vfr of the turning wheel 5R which is a front-right wheel. The front wheel speed sensors 47*l* and 47*r* are sensor hubs provided in hub units which are bearing units (not illustrated) configured to support the turning wheels 5R and 5L with respect to a vehicle body such that the turning wheels 5R and 5L are rotatable.

A rear-left wheel speed sensor 48*l* and a rear-right wheel speed sensor 48*r* are connected to the brake control device 45. The rear-left wheel speed sensor 48*l* detects a rear-left wheel speed Vrl of a rear-left wheel out of rear-right and rear-left wheels (not illustrated) provided on the rear side of the vehicle. The rear-right wheel speed sensor 48*r* detects a rear-right wheel speed Vrr of a rear-right wheel out of the rear-right and rear-left wheels (not illustrated) provided on the rear side of the vehicle. The rear wheel speed sensors 48*l* and 48*r* are sensor hubs provided in hub units which are bearing units (not illustrated) configured to support the rear wheels with respect to the vehicle body such that the rear wheels are rotatable. The steering system 2 according to this embodiment is mounted in a vehicle with a so-called FR system in which a drive torque for rotationally driving the right and left rear wheels is generated using power generated by a drive source such as an engine or a motor which is mounted on the front side of the vehicle. That is, the right and left rear wheels are driving wheels which are driven to generate a driving force required for the vehicle to travel.

The wheel speeds Vfl, Vfr, Vrl, and Vrr are input to the brake control device 45. The brake control device 45 is configured to output the wheel speeds Vfl, Vfr, Vrl, and Vrr to the steering control device 1.

A stop lamp switch 49 is connected to the brake control device 45. When an operation of a brake pedal Bp mounted in the vehicle is detected, the brake control device 45 controls a turned-on/off state of a stop lamp mounted in a rear part of the vehicle such that the stop lamp is in a turned-on state by turning on the stop lamp switch 49. When an operation of the brake pedal Bp is not detected, the brake control device 45 controls the turned-on/off state of the stop lamp such that the stop lamp is in a turned-off state by turning off the stop lamp switch 49. The brake control device 45 generates a stop lamp signal S as information indicating the turned-on/off state of the stop lamp. The stop lamp signal S is information indicating whether the brake pedal Bp is being operated, that is, whether the vehicle is in a decelerating state out of an accelerating-decelerating state of the vehicle. When the stop lamp switch 49 is turned on, the brake control device 45 generates the stop lamp signal S indicating the turned-on state. When the stop lamp switch 49 is turned off, the brake control device 45 generates the stop lamp signal S indicating the turned-off state. The brake control device 45 is configured to output the stop lamp signal S to the steering control device 1.

Functions of Steering Control Device 1

The steering control device 1 includes a central processing unit (CPU) and a memory which are not illustrated, and the CPU executes a program stored in the memory at intervals of a predetermined operation cycle. As a result, various processes are performed.

Figure 2:
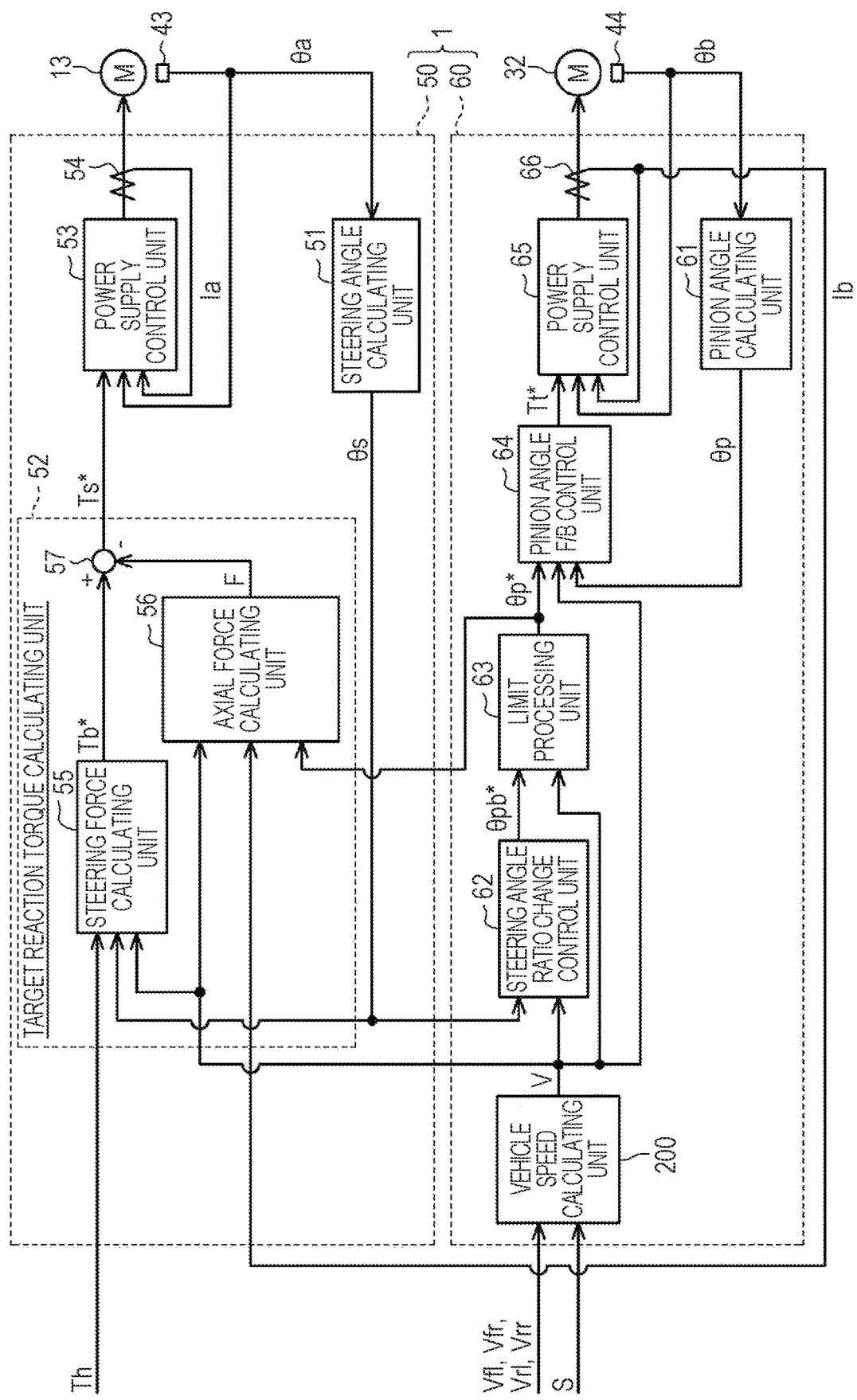
FIG. 2 is a block diagram illustrating functions of a steering control device.

Some processes which are performed by the steering control device 1 are illustrated in FIG. 2. The processes illustrated in FIG. 2 are some processes which are realized by causing the CPU to execute a program stored in the memory. FIG. 2 illustrates each kind of processes which are realized.

As illustrated in FIG. 2, the steering control device 1 includes a steering-side control unit 50 that controls supply of electric power to the steering-side motor 13. The steering-side control unit 50 includes a steering-side current sensor 54. The steering-side current sensor 54 detects a steering-side actual current value Ia acquired from values of phase currents of the steering-side motor 13 flowing in connection lines between the steering-side control unit 50 and phase motor coils of the steering-side motor 13. The steering-side current sensor 54 acquires, as a current, a voltage drop of a shunt resistor connected to the source side of each switching element in an inverter (not illustrated) provided to correspond to the steering-side motor 13. In FIG. 2, for the purpose of convenience of description, one of each of the phase connection lines and the phase current sensors is collectively illustrated.

The steering control device 1 includes a turning-side control unit 60 that controls supply of electric power to the turning-side motor 32. The turning-side control unit 60 includes a turning-side current sensor 66. The turning-side current sensor 66 detects a turning-side actual current value Ib which is acquired from values of phase currents of the turning-side motor 32 flowing in connection lines between the turning-side control unit 60 and phase motor coils of the turning-side motor 32. The turning-side current sensor 66 acquires, as a current, a voltage drop of a shunt resistor connected to the source side of each switching element in an inverter (not illustrated) provided to correspond to the turning-side motor 32. In FIG. 2, for the purpose of convenience of description, one of each of the phase connection lines and the phase current sensors is collectively illustrated.

The steering control device 1 includes a vehicle speed calculating unit 200. The vehicle speed calculating unit 200 calculates a control vehicle speed V as a vehicle speed that is acquired by estimating a vehicle body speed that is a speed at which the vehicle is actually traveling. The vehicle body speed can also be said to be a speed which is sensed by an occupant of the vehicle. The wheel speeds Vfl, Vfr, Vrl, and Vrr and the stop lamp signal S are input to the vehicle speed calculating unit 200. The vehicle speed calculating unit 200 calculates the control vehicle speed V based on the wheel speeds Vfl, Vfr, Vrl, and Vrr and the stop lamp signal S. The function of the vehicle speed calculating unit 200 will be described later in detail. The acquired control vehicle speed V is output as one state variable used to control the operation of the steering system 2, to the steering-side control unit 50 and the turning-side control unit 60. In this embodiment, the vehicle speed calculating unit 200 is realized as one function of the turning-side control unit 60. In this embodiment, the turning-side control unit 60 corresponds to a vehicle speed calculating device. That is, the steering control device 1 including the turning-side control unit 60 corresponds to a vehicle speed calculating device.

Steering-Side Control Unit 50

The steering torque Th, the control vehicle speed V, the rotation angle θa, the turning-side actual current value Ib, and a target pinion angle θp* which will be described later are input to the steering-side control unit 50. The steering-side control unit 50 controls supply of electric power to the steering-side motor 13 based on the steering torque Th, the control vehicle speed V, the rotation angle θa, the turning-side actual current value Ib, and the target pinion angle θp*.

The steering-side control unit 50 includes a steering angle calculating unit 51, a target reaction torque calculating unit 52, and a power supply control unit 53. The rotation angle θa is input to the steering angle calculating unit 51. The steering angle calculating unit 51 converts the rotation angle θa to a total angle in a range including a range exceeding 360 degrees, for example, by counting the number of rotations of the steering-side motor 13 from a steering neutral point which is a position of the steering wheel 3 when the vehicle moves straight ahead. The steering angle calculating unit 51 calculates the steering angle θs by multiplying the total angle acquired by conversion, by a conversion factor based on a rotation speed ratio of the speed reduction mechanism 14. The calculated steering angle θs is output to the target reaction torque calculating unit 52. The steering angle θs is output to the turning-side control unit 60, that is, a steering angle ratio change control unit 62 which will be described later.

The steering torque Th, the control vehicle speed V, the turning-side actual current value Ib, the steering angle θs, and a target pinion angle θp* which will be described later are input to the target reaction torque calculating unit 52. The target reaction torque calculating unit 52 calculates a target reaction torque Ts* which is a target reaction control value of the steering reaction force for the steering wheel 3 which is to be generated by the steering-side motor 13, based on the steering torque Th, the control vehicle speed V, the turning-side actual current value Ib, the steering angle θs, and the target pinion angle θp*.

Specifically, the target reaction torque calculating unit 52 includes a steering force calculating unit 55 and an axial force calculating unit 56. The steering torque Th, the control vehicle speed V, and the steering angle θs are input to the steering force calculating unit 55. The steering force calculating unit 55 calculates a steering force Tb* based on the steering torque Th, the control vehicle speed V, and the steering angle θs.

Figure 3:
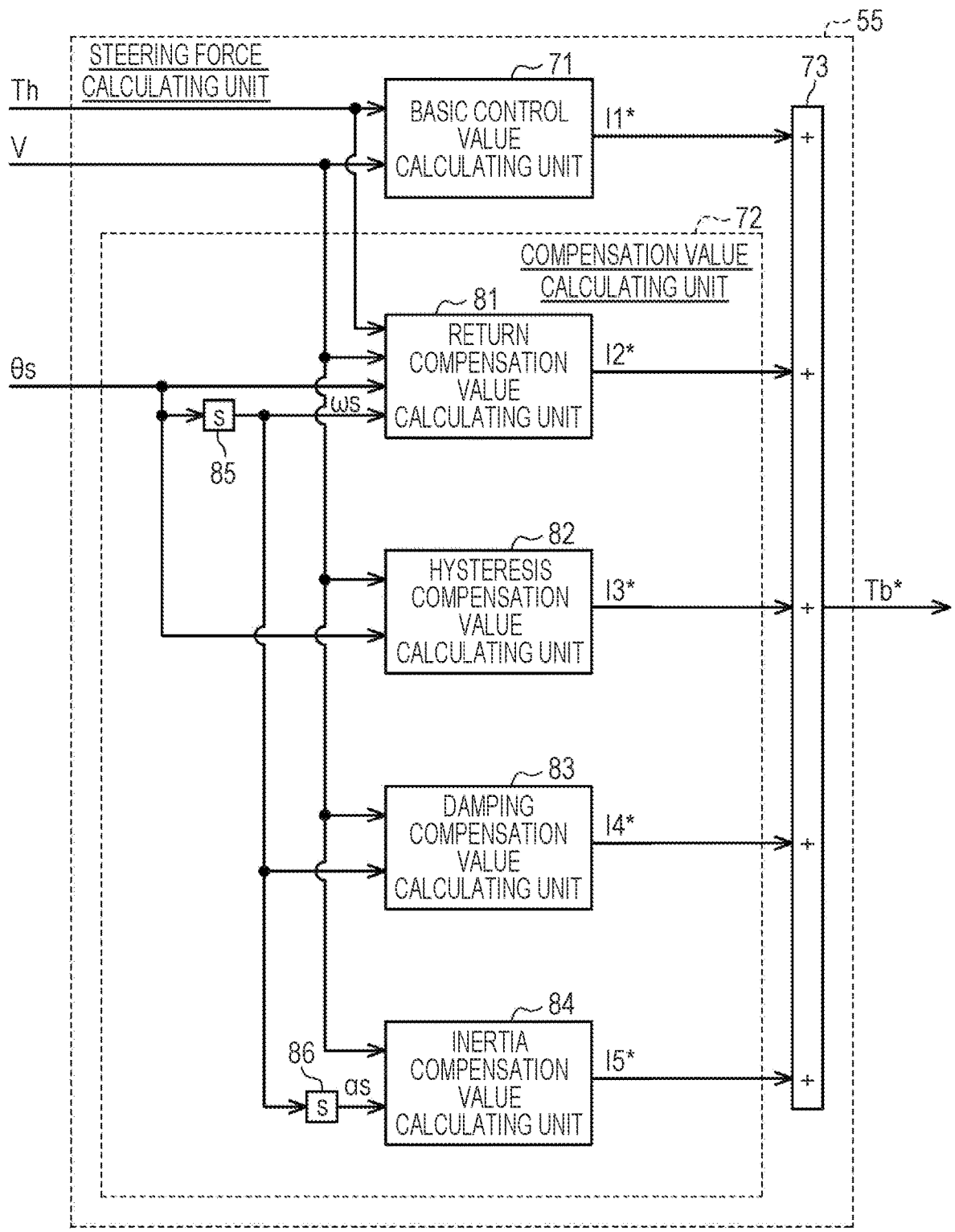
FIG. 3 is a block diagram illustrating functions of a steering force calculating unit in a steering-side control unit.

Specifically, as illustrated in FIG. 3, the steering force calculating unit 55 includes a basic control value calculating unit 71 and a compensation value calculating unit 72. The steering torque Th and the control vehicle speed V are input to the basic control value calculating unit 71. The basic control value calculating unit 71 calculates a basic control value I1* based on the steering torque Th and the control vehicle speed V. The basic control value I1* is a control value which is calculated in association with steering of the steering wheel 3. The basic control value I1* is a basic component of the steering force Tb* and is set such that steering of the steering wheel 3 indicates desired characteristics. For example, the basic control value calculating unit 71 calculates the basic control value I1* such that the absolute value thereof becomes larger as the absolute value of the steering torque Th becomes larger and as the control vehicle speed V becomes lower in consideration of an assist gradient which is a rate of change of the basic control value I1* with respect to change of the steering torque Th. The acquired basic control value I1* is output to an adder 73.

The steering torque Th, the control vehicle speed V, and the steering angle θs are input to the compensation value calculating unit 72. The compensation value calculating unit 72 calculates a return compensation value I2*, a hysteresis compensation value I3*, a damping compensation value I4*, and an inertia compensation value I5* which will be described below, based on the steering torque Th, the control vehicle speed V, and the steering angle θs. Various kinds of compensation values include a phase-delay compensation value used to perform phase compensation such that the phase of the steering torque Th is delayed and a phase-advance compensation value used to perform phase compensation such that the phase of the basic control value I1* is advanced though not illustrated in the drawing, in addition to the aforementioned compensation values I2* to I5*. The phase-delay compensation value is for adjusting the assist gradient. The phase-advance compensation value is for stabilizing a system by curbing resonance characteristics. The various kinds of compensation values are compensation values used to perform compensation such that the operation of the steering wheel 3 realized based on the basic control value I1* indicates desired characteristics.

The compensation value calculating unit 72 includes a return compensation value calculating unit 81, a hysteresis compensation value calculating unit 82, a damping compensation value calculating unit 83, and an inertia compensation value calculating unit 84. The steering torque Th, the control vehicle speed V, the steering angle θs, and a steering velocity ωs which is acquired from a differentiator 85 by differentiating the steering angle θs are input to the return compensation value calculating unit 81. The return compensation value calculating unit 81 calculates the return compensation value I2* based on the steering torque Th, the control vehicle speed V, the steering angle θs, and the steering velocity ωs. The return compensation value I2* is for performing compensation for a return operation of the steering wheel 3 returning to the steering neutral position. The return operation of the steering wheel 3 is associated with a self-aligning torque of the turning wheels 5R and 5L, and excess and deficiency of the self-aligning torque are compensated for by the return compensation value I2*. The return compensation value I2* is for generating a torque in a direction in which the steering wheel 3 returns to the steering neutral position. The acquired return compensation value I2* is output to the adder 73.

The control vehicle speed V and the steering angle θs are input to the hysteresis compensation value calculating unit 82. The hysteresis compensation value calculating unit 82 calculates the hysteresis compensation value I3* based on the control vehicle speed V and the steering angle θs. The hysteresis compensation value I3* is for performing compensation such that hysteresis characteristics due to friction at the time of operation of the steering wheel 3 are optimized. The hysteresis characteristics due to friction at the time of operation of the steering wheel 3 are associated with a mechanical friction component of the vehicle in which the steering system 2 is mounted, and the hysteresis characteristics due to the mechanical friction component are optimized by compensation with the hysteresis compensation value I3*. The hysteresis compensation value I3* has hysteresis characteristics with respect to change of the steering angle θs. The acquired hysteresis compensation value I3* is output to the adder 73.

The control vehicle speed V and the steering velocity ωs are input to the damping compensation value calculating unit 83. The damping compensation value calculating unit 83 calculates the damping compensation value I4* based on the control vehicle speed V and the steering velocity ωs. The damping compensation value I4* is for performing compensation such that minute vibration generated in the steering wheel 3 is reduced. Reduction of minute vibration generated in the steering wheel 3 is associated with a viscosity component of the steering system 2, particularly, a viscosity component of the turning-side actuator 31, and minute vibration in the steering wheel 3 is reduced by compensation with the damping compensation value I4*. The damping compensation value I4* is for generating a torque in a direction opposite to the direction in which the steering velocity ωs is generated at that time. The acquired damping compensation value I4* is output to the adder 73.

The control vehicle speed V and a steering acceleration as which is acquired from a differentiator 86 by differentiating the steering velocity ωs are input to the inertia compensation value calculating unit 84. The inertia compensation value calculating unit 84 calculates the inertia compensation value I5* based on the control vehicle speed V and the steering acceleration as. The inertia compensation value I5* is for performing compensation such that a feeling of being caught at the start time of steering of the steering wheel 3 and a flow feeling (overshoot) at the end time of steering are curbed. Curbing of a feeling of being caught at the start time of steering of the steering wheel 3 and a flow feeling (overshoot) at the end time of steering is associated with an inertia component of the steering system 2, and a feeling of being caught at the start time of steering of the steering wheel 3 and a flow feeling (overshoot) at the end time of steering are curbed by compensation with the inertia compensation value I5*. The inertia compensation value I5* is for generating a torque in a direction in which the steering acceleration as is generated when the absolute value of the steering acceleration as increases, for example, at the start time of steering of the steering wheel 3, and generating a torque in a direction opposite to the direction in which the steering acceleration as is generated when the absolute value of the steering acceleration as decreases, for example, at the end time of steering of the steering wheel 3. The acquired inertia compensation value I5* is output to the adder 73.

The adder 73 calculates the steering force Tb* by adding the compensation values I2* to I5* to the basic control value I1*. In addition to the compensation values I2* to I5*, for example, the phase-delay compensation value or the phase-advance compensation value is added to the basic control value I1* and reflected therein. The acquired steering force Tb* is output to a subtractor 57. The steering force Tb* acts in the same direction as a driver's steering direction. The steering force Tb* is calculated as a value with the dimension of a torque (N·m).

As illustrated in FIG. 2, the control vehicle speed V, the turning-side actual current value Ib, and the target pinion angle θp* which will be described later are input to the axial force calculating unit 56. The axial force calculating unit 56 calculates an axial force F acting on the rack shaft 22 via the turning wheels 5R and 5L based on the control vehicle speed V, the turning-side actual current value Ib, and the target pinion angle θp*.

Figure 4:
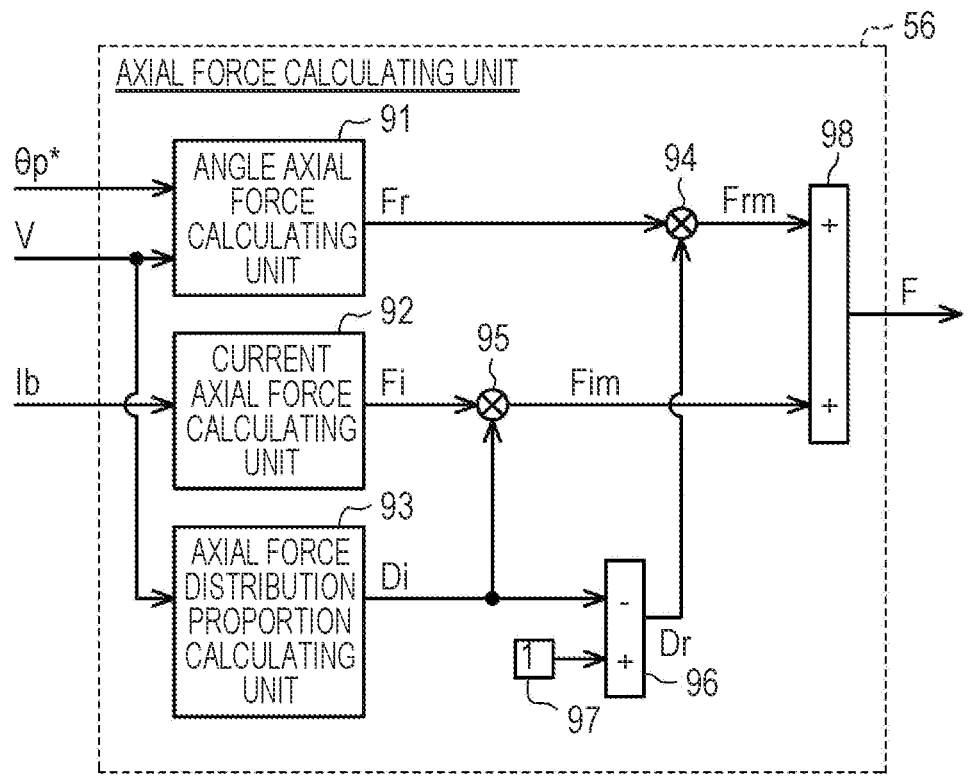
FIG. 4 is a block diagram illustrating functions of an axial force calculating unit in the steering-side control unit.

Specifically, as illustrated in FIG. 4, the axial force calculating unit 56 includes an angle axial force calculating unit 91, a current axial force calculating unit 92, and an axial force distribution proportion calculating unit 93. The target pinion angle θp* which will be described later and the control vehicle speed V are input to the angle axial force calculating unit 91. The angle axial force calculating unit 91 calculates an angle axial force Fr based on the target pinion angle θp* and the control vehicle speed V. The angle axial force Fr is an ideal value of an axial force which is defined by a model for a vehicle which is arbitrarily set. The angle axial force Fr is calculated as an axial force in which road surface information is not reflected. Road surface information is information such as fine unevenness that does not affect the behavior of the vehicle in the lateral direction or a stepped portion affecting the behavior of the vehicle in the lateral direction. For example, the angle axial force calculating unit 91 calculates the angle axial force Fr such that the absolute value thereof increases as the absolute value of the target pinion angle θp* increases. The angle axial force calculating unit 91 calculates the angle axial force Fr such that the absolute value thereof increases as the control vehicle speed V increases. The angle axial force Fr is calculated as a value with the dimension of a torque (N·m). The acquired angle axial force Fr is output to a multiplier 94.

The turning-side actual current value Ib is input to the current axial force calculating unit 92. The current axial force calculating unit 92 calculates a current axial force Fi based on the turning-side actual current value Ib. The current axial force Fi is an estimated value of an axial force actually acting on the rack shaft 22 that operates to turn the turning wheels 5R and 5L, that is, an axial force which is actually transmitted to the rack shaft 22. The current axial force Fi is calculated, for example, as an axial force in which the road surface information is reflected. For example, the current axial force calculating unit 92 calculates the current axial force Fi such that the absolute value of the current axial force Fi increases as the absolute value of the turning-side actual current value Ib increases, based on the assumption that a torque applied to the rack shaft 22 by the turning-side motor 32 and a torque corresponding to a force applied to the rack shaft 22 via the turning wheels 5R and 5L are balanced. The current axial force Fi is calculated as a value with the dimension of a torque (N·m). The acquired current axial force Fi is output to a multiplier 95.

The control vehicle speed V is input to the axial force distribution proportion calculating unit 93. The axial force distribution proportion calculating unit 93 calculates an axial force distribution gain Di based on the control vehicle speed V. The axial force distribution gain Di is a distribution proportion of the current axial force Fi when the angle axial force Fr and the current axial force Fi are summed at distribution proportions to acquire the axial force F. The axial force distribution proportion calculating unit 93 includes an axial force distribution gain map in which a relationship between the control vehicle speed V and the axial force distribution gain Di is defined. The axial force distribution proportion calculating unit 93 calculates the axial force distribution gain Di using the map and using the control vehicle speed V as an input. The current axial force Fi is multiplied by the acquired axial force distribution gain Di and is output to an adder 98 as a final current axial force Fim acquired from the multiplier 95. The subtractor 96 calculates an axial force distribution gain Dr by subtracting the axial force distribution gain Di from "1" stored in a storage unit 97. The acquired axial force distribution gain Dr is output to the multiplier 94. The axial force distribution gain Dr is a distribution proportion of the angle axial force Fr when the axial force F is acquired. That is, the axial force distribution gain Dr is calculated such that a sum with the axial force distribution gain Di is "1 (100%)." The distribution proportion includes a concept of a zero value in which only one of the angle axial force Fr and the current axial force Fi is distributed to the axial force F. The storage unit 97 is a predetermined storage area of a memory which is not illustrated.

The angle axial force Fr acquired by the angle axial force calculating unit 91 is multiplied by the acquired axial force distribution gain Dr and is output, as a final angle axial force Frm acquired by the multiplier 94, to the adder 98. The adder 98 calculates the axial force F by adding the angle axial force Frm to the current axial force Fim (i.e., by summing the angle axial force Frm and the current axial force Fim). The axial force F acts in a direction opposite to a driver's steering direction. The axial force F is calculated as a value with the dimension of a torque (N·m). The acquired axial force F is output to the subtractor 57. The subtractor 57 calculates a target reaction torque Ts* by subtracting the axial force F from the steering force Tb*. The acquired target reaction torque Ts* is output to the power supply control unit 53.

As illustrated in FIG. 2, the target reaction torque Ts*, the rotation angle θa, and the steering-side actual current value Ia are input to the power supply control unit 53. The power supply control unit 53 calculates a current command value Ia* for the steering-side motor 13 based on the target reaction torque Ts*. The power supply control unit 53 calculates a difference between the current command value Ia* and a current value on a d-q coordinate system acquired by converting the steering-side actual current value Ia based on the rotation angle θa, and controls supply of electric power to the steering-side motor 13 such that the difference is cancelled out. The steering-side motor 13 generates a torque corresponding to the target reaction torque Ts*. Accordingly, it is possible to give an appropriate feeling of responsiveness to a driver.

Turning-Side Control Unit 60

The turning-side control unit 60 includes a pinion angle calculating unit 61, a steering angle ratio change control unit 62, a limit processing unit 63, a pinion angle feedback control unit ("pinion angle FB control unit" in FIG. 2) 64, a power supply control unit 65, and a vehicle speed calculating unit 200.

The rotation angle θb is input to the pinion angle calculating unit 61. The pinion angle calculating unit 61 converts the rotation angle θb to a total angle in a range including a range exceeding 360 degrees, for example, by counting the number of rotations of the turning-side motor 32 from a rack neutral position which is a position of the rack shaft 22 when the vehicle travels straight ahead. The pinion angle calculating unit 61 calculates the pinion angle θp by multiplying the total angle acquired by conversion, by a conversion factor based on a reduction speed ratio of the transmission mechanism 33, a lead of the conversion mechanism 34, and a rotation speed ratio of the rack and pinion mechanism 24. The pinion angle θp acquired in this way is output to the pinion angle feedback control unit 64.

The control vehicle speed V and the steering angle θs are input to the steering angle ratio change control unit 62. The steering angle ratio change control unit 62 calculates a pre-limiting target pinion angle θpb* by adding an adjustment value to the steering angle θs. The pre-limiting target pinion angle θpb* is a base component of a final target pinion angle θp*. The steering angle ratio change control unit 62 changes an adjustment value for changing the steering angle ratio which is a ratio of the target pinion angle θpb* to the steering angle θs, according to the control vehicle speed V. For example, the adjustment value is changed such that a change of the target pinion angle θpb* with respect to the steering angle θs is larger when the control vehicle speed V is small than that when the control vehicle speed V is large. There is a correlation between the steering angle θs and the target pinion angle θpb*. The pinion angle θp is controlled based on the target pinion angle θp* with the target pinion angle θpb* serving as a base component of the target pinion angle θp*. Accordingly, there is also a correlation between the steering angle θs and the pinion angle θp. The acquired target pinion angle θpb* is output to the limit processing unit 63.

Figure 5:
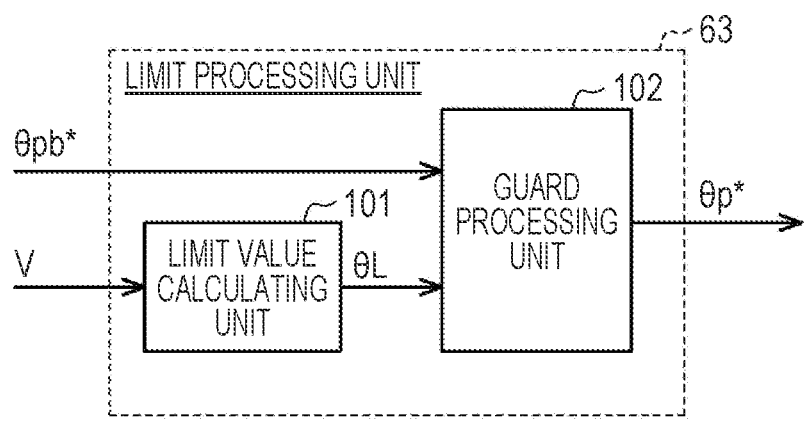
FIG. 5 is a block diagram illustrating functions of a limit processing unit in a turning-side control unit.

The control vehicle speed V and the target pinion angle θpb* are input to the limit processing unit 63. Specifically, as illustrated in FIG. 5, the limit processing unit 63 includes a limit value calculating unit 101 and a guard processing unit 102.

The control vehicle speed V is input to the limit value calculating unit 101. The limit value calculating unit 101 calculates a limit value θL for the target pinion angle θpb* based on the control vehicle speed V. The range of change of the target pinion angle θpb* is limited by the limit value L. The limit value θL is set based on a limit value of an angle which is determined to maintain a balance between a maximum output of the turning-side motor 32 and the axial force acting on the rack shaft 22 according to axial force characteristics of the vehicle. An axial force acting on the rack shaft 22 at the time of turning the turning wheels 5R and 5L varies depending on the control vehicle speed V. For example, the limit value calculating unit 101 calculates the limit value θL such that the absolute value thereof decreases as the control vehicle speed V increases when the axial force acting on the rack shaft 22 at the time of turning the turning wheels 5R and 5L is likely to be less when the control vehicle speed V is relatively high than when the control vehicle speed V is relatively low. The acquired limit value θL is output to the guard processing unit 102.

The target pinion angle θpb* and the limit value θL are input to the guard processing unit 102. The guard processing unit 102 performs a limiting process such that the target pinion angle θpb* is limited to the limit value θL based on the limit value L. That is, the guard processing unit 102 compares the target pinion angle θpb* with the limit value θL, and when the absolute value of the target pinion angle θpb* is greater than the limit value θL, the guard processing unit 102 calculates, as the final target pinion angle θp*, a value obtained by limiting the absolute value of the target pinion angle θpb* to the limit value θL, instead of the target pinion angle θpb*. When the absolute value of the target pinion angle θpb* is equal to or less than the limit value θL, the guard processing unit 102 calculates the target pinion angle θpb* acquired by the steering angle ratio change control unit 62 as the final target pinion angle θp* without any change. The acquired final target pinion angle θp* is output to the pinion angle feedback control unit 64. The target pinion angle θp* is output to the steering-side control unit 50, that is, the axial force calculating unit 56.

Figure 6:
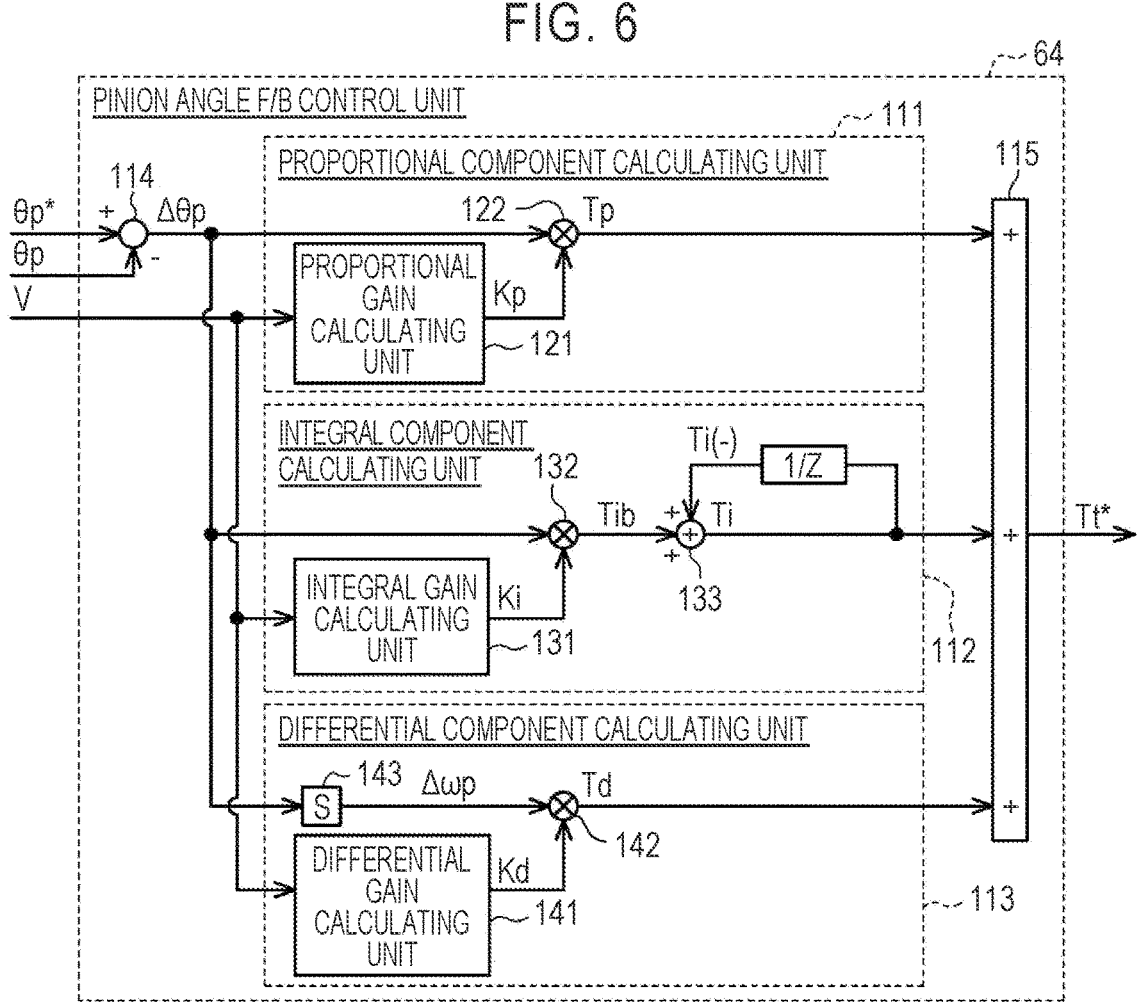
FIG. 6 is a block diagram illustrating functions of a pinion angle feedback control unit in the turning-side control unit.

As illustrated in FIG. 2, the control vehicle speed V, the target pinion angle θp*, and the pinion angle θp are input to the pinion angle feedback control unit 64. Specifically, as illustrated in FIG. 6, the pinion angle feedback control unit 64 includes a proportional component calculating unit 111, an integral component calculating unit 112, and a differential component calculating unit 113.

The control vehicle speed V and an angle difference Δθp acquired from a subtractor 114 by subtracting the pinion angle θp from the target pinion angle θp* are input to the proportional component calculating unit 111. The proportional component calculating unit 111 calculates a proportional gain Kp using a proportional gain calculating unit 121. The proportional gain calculating unit 121 calculates the proportional gain Kp based on the control vehicle speed V. The angle difference Δθp is multiplied by the acquired proportional gain Kp to acquire a proportional component Tp using the multiplier 122, and the proportional component Tp is output to an adder 115.

The control vehicle speed V and the angle difference Δθp are input to the integral component calculating unit 112. The integral component calculating unit 112 calculates an integral gain Ki using an integral gain calculating unit 131. The integral gain calculating unit 131 calculates the integral gain Ki based on the control vehicle speed V. The angle difference Δθp is multiplied by the acquired integral gain Ki to acquire an integral base component Tib using the multiplier 132, and the integral base component Tib is output to an adder 133. The adder 133 calculates an integrated value acquired by adding a previous integral component Ti(−) to the integral base component Tib calculated in this operation cycle, as the integral component Ti. The previous integral component Ti(−) is an integrated value acquired by repeatedly performing addition of the integral base component Tib calculated up to the previous calculation cycle. The acquired integral component Ti is output to the adder 115.

The control vehicle speed V and the angle difference $\Delta\theta p$ are input to the differential component calculating unit 113. The differential component calculating unit 113 calculates a differential gain Kd using a differential gain calculating unit 141. An angular velocity difference $\Delta\omega p$ is multiplied by the acquired differential gain Kd to acquire a differential component Td using the multiplier 142, and the differential component Td is output to the adder 115. The angular velocity difference $\Delta\omega p$ is acquired by differentiating the angle difference $\Delta\theta p$ using a differentiator 143.

The adder 115 calculates a turning force command value Tt* by summing the proportional component Tp, the integral component Ti, and the differential component Td. The acquired turning force command value Tt* is output to the power supply control unit 65.

The turning force command value Tt*, the rotation angle $\theta b$, and the turning-side actual current value Ib are input to the power supply control unit 65. The power supply control unit 65 calculates a current command value Ib* for the turning-side motor 32 based on the turning force command value Tt*. The power supply control unit 65 calculates a difference between the current command value Ib* and a current value on the d-q coordinate system acquired by converting the turning-side actual current value Ib based on the rotation angle $\theta b$, and controls supply of electric power to the turning-side motor 32 such that the difference is cancelled out. Accordingly, the turning-side motor 32 rotates by an angle corresponding to the turning force command value Tt*.

Vehicle Speed Calculating Unit 200

Figure 7:
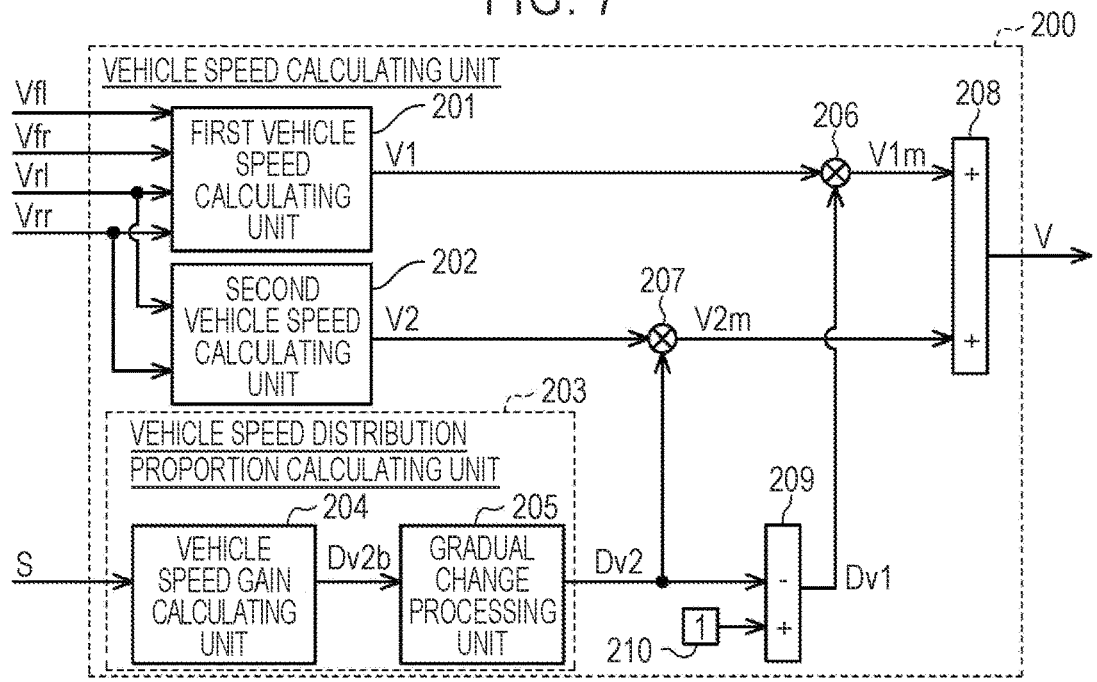
FIG. 7 is a block diagram illustrating functions of a vehicle speed calculating unit in a turning-side control unit according to a first embodiment.

Functions of the vehicle speed calculating unit 200 will be described below in detail. As illustrated in FIG. 7, the vehicle speed calculating unit 200 includes a first vehicle speed calculating unit 201, a second vehicle speed calculating unit 202, and a vehicle speed distribution proportion calculating unit 203.

Figure 8:
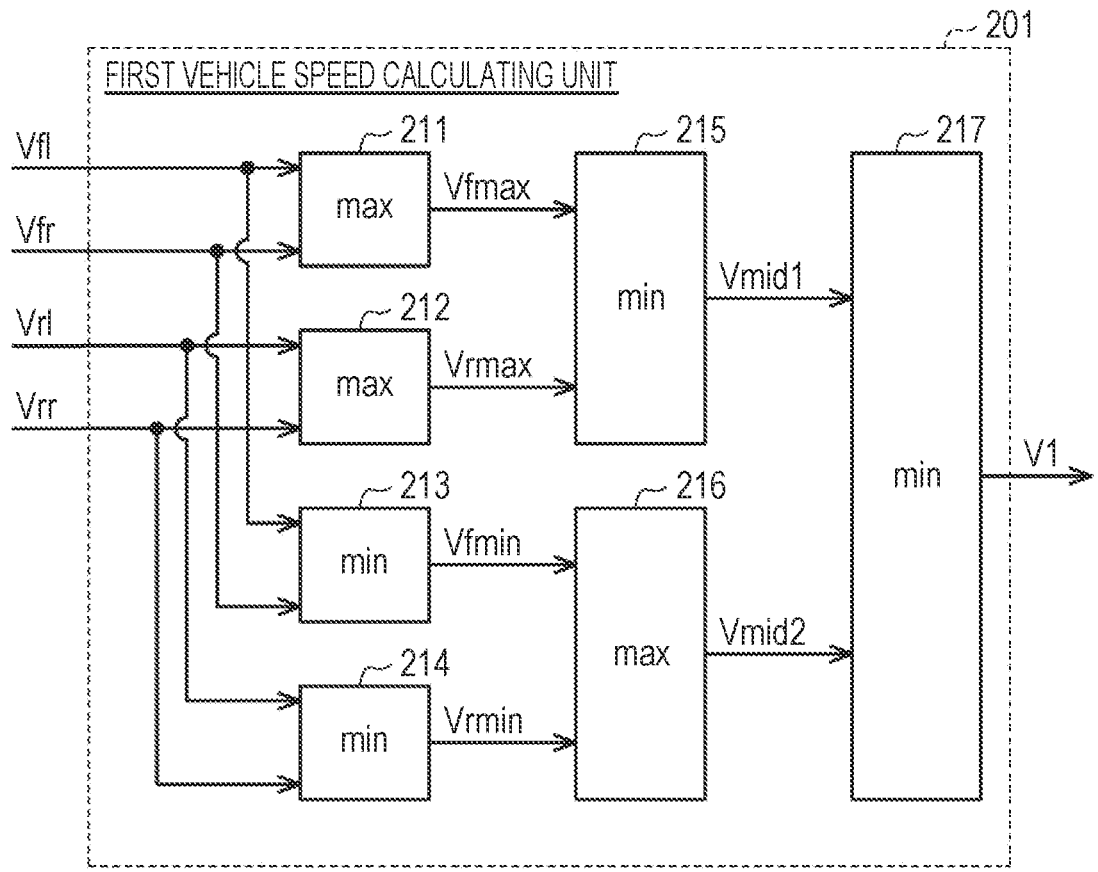
FIG. 8 is a block diagram illustrating functions of a first vehicle speed calculating unit in the vehicle speed calculating unit according to the first embodiment.

The wheel speeds Vfl, Vfr, Vrl, and Vrr are input to the first vehicle speed calculating unit 201. Specifically, as illustrated in FIG. 8, the first vehicle speed calculating unit 201 includes a first maximum value calculating unit 211, a second maximum value calculating unit 212, a first minimum value calculating unit 213, a second minimum value calculating unit 214, a third minimum value calculating unit 215, a third maximum value calculating unit 216, and a fourth minimum value calculating unit 217.

The front wheel speeds Vfl and Vfr are input to the first maximum value calculating unit 211. The first maximum value calculating unit 211 performs calculation such that the larger one of the front wheel speeds Vfl and Vfr is extracted as a front-wheel maximum value Vfmax. The front-wheel maximum value Vfmax is a maximum value out of the wheel speeds of the front-right and front-left wheels. The acquired front-wheel maximum value Vfmax is output to the third minimum value calculating unit 215.

The rear wheel speeds Vrl and Vrr are input to the second maximum value calculating unit 212. The second maximum value calculating unit 212 performs calculation such that the larger one of the rear wheel speeds Vrl and Vrr is extracted as a rear-wheel maximum value Vrmax. The rear-wheel maximum value Vrmax is a maximum value out of the wheel speeds of the rear-right and rear-left wheels. The acquired rear-wheel maximum value Vrmax is output to the third minimum value calculating unit 215.

The front wheel speeds Vfl and Vfr are input to the first minimum value calculating unit 213. The first minimum value calculating unit 213 performs calculation such that the smaller one of the front wheel speeds Vfl and Vfr is extracted as a front-wheel minimum value Vfmin. The front-wheel minimum value Vfmin is a minimum value out of the wheel speeds of the front-right and front-left wheels. The acquired front-wheel minimum value Vfmin is output to the third maximum value calculating unit 216.

The rear wheel speeds Vrl and Vrr are input to the second minimum value calculating unit 214. The second minimum value calculating unit 214 performs calculation such that the smaller one of the rear wheel speeds Vrl and Vrr is extracted as a rear-wheel minimum value Vrmin. The rear-wheel minimum value Vrmin is a minimum value out of the wheel speeds of the rear-right and rear-left wheels. The acquired rear-wheel minimum value Vrmin is output to the third maximum value calculating unit 216.

The wheel maximum values Vfmax and Vrmax are input to the third minimum value calculating unit 215. The third minimum value calculating unit 215 performs calculation such that the smaller one of the wheel maximum values Vfmax and Vrmax is extracted as a first wheel-speed mid value Vmid1. The first wheel-speed mid value Vmid1 is a mid value with a second or third largest magnitude out of the wheel speeds of four wheels including the front-right and front-left wheels and the rear-right and rear-left wheels. That is, the first wheel-speed mid value Vmid1 is a value obtained by excluding the maximum value and the minimum value from the wheel speeds of the four wheels. The acquired first wheel-speed mid value Vmid1 is output to the fourth minimum value calculating unit 217.

The wheel minimum values Vfmin and Vrmin are input to the third maximum value calculating unit 216. The third maximum value calculating unit 216 performs calculation such that the larger one of the wheel minimum values Vfmin and Vrmin is extracted as a second wheel-speed mid value Vmid2. The second wheel-speed mid value Vmid2 is a mid value with a second or third largest magnitude out of the wheel speeds of four wheels. That is, the second wheel-speed mid value Vmid2 is a value obtained by excluding the maximum value and the minimum value from the wheel speeds of the four wheels. The acquired second wheel-speed mid value Vmid2 is output to the fourth minimum value calculating unit 217.

The wheel-speed mid values Vmid1 and Vmid2 are input to the fourth minimum value calculating unit 217. The fourth minimum value calculating unit 217 performs calculation such that the smaller one of the wheel-speed mid values Vmid1 and Vmid2 is extracted as a first vehicle speed V1. The first vehicle speed V1 is a mid value with the third largest magnitude out of the wheel speeds of the four wheels. The acquired first vehicle speed V1 is output to the multiplier 206.

Each of the wheel speeds with the first and second largest magnitudes out of the wheel speeds of four wheels is more likely to be information acquired from a wheel in a slip state when there is a wheel that idles with respect to a ground contact surface due to acceleration of the vehicle, that is, when there is a wheel in the slip state. This is because, when there is a wheel in the slip state, there is a high likelihood that the number of wheels in the slip state is not one, and a pair of the front-right and front-left wheels or a pair of the rear-right and rear-left wheels is in the slip state. On the other hand, a wheel speed with the third largest magnitude is more likely to be information acquired from a wheel which is not in the slip state, for example, even when the rotation state of some wheels is the slip state. That is, the wheel speed with the third largest magnitude is less likely to be a value acquired from a wheel in the slip state. The wheel speed with the third largest magnitude is a value close to an average value of the wheel speeds of four wheels. In this case, a difference of the wheel speed with the third largest magnitude from the vehicle body speed is smaller than a difference of a wheel speed with the fourth largest magnitude from the vehicle body speed when there is no wheel in the slip state. In this embodiment, the first vehicle speed V1 acquired as a wheel speed with the third largest magnitude is a value having a function of decreasing the difference from the vehicle body speed when the rotation state of some wheels is assumed to be the slip state.

In this embodiment, in the first vehicle speed calculating unit 201, extracting the wheel speed with the third largest magnitude out of the wheel speeds of four wheels corresponds to an extraction function, that is, a first extraction function. In the first vehicle speed calculating unit 201, calculating the wheel speed with the third largest magnitude out of the wheel speeds of four wheels as the first vehicle speed V1 corresponds to a calculation function.

Figure 9:
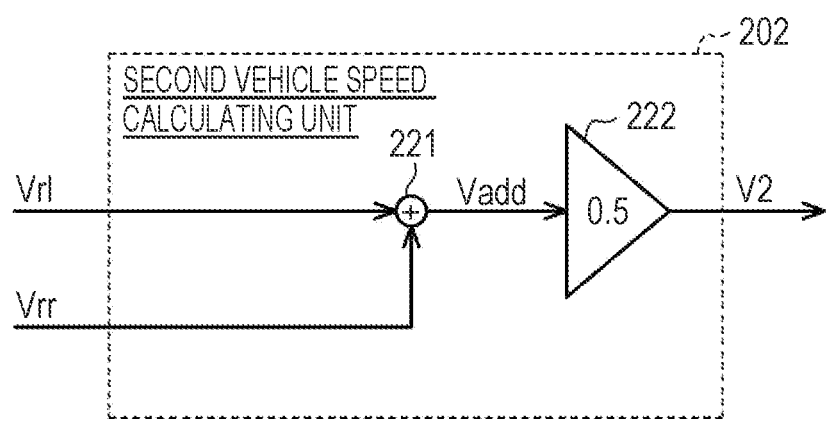
FIG. 9 is a block diagram illustrating functions of a second vehicle speed calculating unit in the vehicle speed calculating unit according to the first embodiment.

The rear wheel speeds Vrl and Vrr are input to the second vehicle speed calculating unit 202. Specifically, as illustrated in FIG. 9, the rear wheel speeds Vrl and Vrr of two wheels extracted out of the wheel speeds Vfl, Vfr, Vrl, and Vrr of the four wheels are input to the second vehicle speed calculating unit 202. The second vehicle speed calculating unit 202 calculates a rear-wheel added value Vadd which is an added value (sum value) of the rear wheel speeds Vrl and Vrr obtained from the adder 221 by summing the rear wheel speeds Vrl and Vrr. The acquired rear-wheel added value Vadd is multiplied by a predetermined gain "0.5 (½)" using a gain multiplier 222, and is output to the multiplier 207 as a second vehicle speed V2. That is, the second vehicle speed V2 is calculated as an average value of the rear wheel speeds Vrl and Vrr.

The rear-right and rear-left wheels out of four wheels are determined in advance in design of a vehicle as wheels which are less likely to be in a so-called locked state, from a viewpoint of travel stability of the vehicle. The locked state is a state in which a wheel does not rotate with respect to the ground contact surface due to braking of the vehicle. That is, the wheel speeds acquired from the rear-right and rear-left wheels are more likely to be information acquired from wheels which are not in the locked state, for example, even when the rotation state of some wheels is the locked state. That is, the wheel speeds acquired from the rear-right and rear-left wheels are less likely to be values acquired from wheels in the locked state. In this case, differences of the wheel speeds acquired from the rear-right and rear-left wheels from the vehicle body speed are small unless all the four wheels are in the locked state. In this embodiment, the second vehicle speed V2 acquired from the rear-right and rear-left wheels is a value having a function of decreasing the difference from the vehicle body speed when the rotation state of some wheels is assumed to be the locked state.

In this second vehicle speed calculating unit 202, inputting the rear wheel speeds Vrl and Vrr acquired from the rear-right and rear-left wheels determined to be less likely to fall into the locked state in design of a vehicle and extracted out of the wheel speeds of four wheels corresponds to an extraction function, that is, a second extraction function. In the second vehicle speed calculating unit 202, calculating an average value of the rear wheel speeds Vrl and Vrr out of the wheel speeds of four wheels as the second vehicle speed V2 corresponds to a calculation function.

As illustrated in FIG. 7, the vehicle speed distribution proportion calculating unit 203 includes a vehicle speed gain calculating unit 204 and a gradual change processing unit 205. The stop lamp signal S is input to the vehicle speed gain calculating unit 204. The vehicle speed gain calculating unit 204 calculates a base vehicle speed distribution gain Dv2$b$ based on the stop lamp signal S. The vehicle speed gain calculating unit 204 calculates the base vehicle speed distribution gain Dv2$b$ as "1 (100%)" when the stop lamp signal S indicates a turned-on state and calculates the base vehicle speed distribution gain Dv2$b$ as "zero (0%)" when the stop lamp signal S indicates a turned-off state. The acquired base vehicle speed distribution gain Dv2$b$ is subjected to a gradual change process by the gradual change processing unit 205.

Specifically, the gradual change processing unit 205 performs a gradual change process with respect to time on the base vehicle speed distribution gain Dv2$b$ when the base vehicle speed distribution gain Dv2$b$ is switched between "1" and "zero." When the base vehicle speed distribution gain Dv2$b$ is switched between "1" and "zero," the gradual change processing unit 205 acquires a difference between the base vehicle speed distribution gain Dv2$b$ calculated before switching and the base vehicle speed distribution gain Dv2$b$ calculated after switching, that is, the gradual change processing unit 205 acquires "1", and calculates the difference as an offset value. In this case, the gradual change processing unit 205 calculates a vehicle speed distribution gain Dv2 that has been subjected to a gradual change process by shifting the base vehicle speed distribution gain Dv2$b$ after switching toward the base vehicle speed distribution gain Dv2$b$ before switching by the offset value. Then, the gradual change processing unit 205 performs the gradual change process of changing the vehicle speed distribution gain Dv2 such that it becomes the original value after switching by gradually decreasing the offset value with the elapse of time. Accordingly, even when the base vehicle speed distribution gain Dv2$b$ is switched between "1" and "zero," sudden change of the vehicle speed distribution gain Dv2 is curbed. When the base vehicle speed distribution gain Dv2$b$ is not switched between "1" and "zero" and the offset value is not present, the gradual change processing unit 205 calculates the base vehicle speed distribution gain Dv2$b$ calculated by the vehicle speed gain calculating unit 204 as the vehicle speed distribution gain Dv2 that has been subjected to the gradual change process. The vehicle speed distribution gain Dv2 serves as a distribution proportion of the second vehicle speed V2 when the control vehicle speed V is acquired by summing the first vehicle speed V1 and the second vehicle speed V2 at distribution proportions.

The second vehicle speed V2 is multiplied by the acquired vehicle speed distribution gain Dv2 using the multiplier 207, and is output to the adder 208 as a final second vehicle speed V2$m$. The subtractor 209 calculates a vehicle speed distribution gain Dv1 by subtracting the vehicle speed distribution gain Dv2 from "1" stored in the storage unit 210. The vehicle speed distribution gain Dv1 is a distribution proportion of the first vehicle speed V1 when the control vehicle speed V is acquired. That is, the vehicle speed distribution gain Dv1 is calculated such that the sum with the vehicle speed distribution gain Dv2 becomes "1 (100%)." The distribution proportion in this embodiment includes a concept of a zero value in which only one of the first vehicle speed V1 and the second vehicle speed V2 is distributed to the control vehicle speed V.

Specifically, regarding the vehicle speed distribution gains Dv1 and Dv2, when the stop lamp signal S indicates the turned-on state, the vehicle speed distribution gain Dv2 is "1" and the vehicle speed distribution gain Dv1 is "zero." In a decelerating state of the vehicle in which the stop lamp signal S indicates the turned-on state, the rotation state of some wheels may be assumed to be the locked state. That is, when the rotation state of some wheels is assumed to be the locked state, it means that only the second vehicle speed V2 is distributed (allocated) to the control vehicle speed V, that is, the first vehicle speed V1 is not distributed (not allocated).

In addition, regarding the vehicle speed distribution gains Dv1 and Dv2, when the stop lamp signal S indicates the turned-off state, the vehicle speed distribution gain Dv2 is "zero" and the vehicle speed distribution gain Dv1 is "1." When the vehicle, in which the stop lamp signal S indicates the turned-off state, is in a state including an accelerating state other than the decelerating state, the rotation state of some wheels may be assumed to be the slip state. That is, when the rotation state of some wheels is assumed to be the slip state, it means that only the first vehicle speed V1 is distributed (allocated) to the control vehicle speed V, that is, that the second vehicle speed V2 is not distributed (not allocated).

The first vehicle speed V1 is multiplied by the acquired vehicle speed distribution gain Dv1 using the multiplier 206, and is output to the adder 208 as a final first vehicle speed V1m. The storage unit 210 is a predetermined storage area of a memory which is not illustrated.

The adder 208 calculates the control vehicle speed V by adding the second vehicle speed V2m to the first vehicle speed V1m. The acquired control vehicle speed V is output to the steering angle ratio change control unit 62, the limit processing unit 63, and the pinion angle feedback control unit 64. The control vehicle speed V is output to the steering-side control unit 50, that is, the steering force calculating unit 55 and the axial force calculating unit 56.

Operations of this embodiment will be described below. According to this embodiment, a wheel speed, which is acquired from a wheel that is assumed to be rotating in a state in which an influence causing the difference from the vehicle body speed is likely to be small out of four wheels rotating in a state in which there are large and small influences causing the differences from the vehicle body speed, is actively considered in calculating the control vehicle speed V. This is realized by the functions of the first vehicle speed calculating unit 201 and the second vehicle speed calculating unit 202 of the vehicle speed calculating unit 200.

Here, a wheel speed acquired from a wheel in a slip state, which is a rotation state of the wheel, is likely to be larger than a wheel speed acquired from a wheel that is not in the slip state, and there is a high likelihood that the wheel speed acquired from the wheel in the slip state is different from the vehicle body speed. On the other hand, there is a low likelihood that wheel speeds, which are classified as small values, i.e., as having the third and fourth largest magnitudes when the values of the wheel speeds of four wheels are classified according to the magnitudes thereof, are values acquired from wheels in the slip state.

Therefore, the first vehicle speed calculating unit 201 is configured to calculate the first vehicle speed V1 acquired by extracting the wheel speed with the third largest magnitude out of the wheel speeds of four wheels. The acquired first vehicle speed V1 is reflected in the control vehicle speed V by the vehicle speed calculating unit 200 when the vehicle is in a state including the accelerating state instead of the decelerating state. In this case, on the assumption that the rotation state of some wheels is the slip state, it is possible to reduce the difference between the vehicle body speed and the control vehicle speed V.

For example, a wheel speed acquired from a wheel in a locked state, which is a rotation state of the wheel, is likely to be smaller than a wheel speed acquired from a wheel that is not in the locked state, and there is a high likelihood that the wheel speed acquired from the wheel in the locked state is different from the vehicle body speed. On the other hand, two rear wheels are determined as wheels which are less likely to be in the locked state in design of the vehicle from the viewpoint of travel stability of the vehicle.

Therefore, the second vehicle speed calculating unit 202 is configured to calculate the second vehicle speed V2 acquired by extracting the wheel speeds of the rear-right and rear-left wheels out of the wheel speeds of four wheels. The acquired second vehicle speed V2 is reflected in the control vehicle speed V by the vehicle speed calculating unit 200 when the vehicle is in the decelerating state. In this case, on the assumption that the rotation state of some wheels is the locked state, it is possible to reduce the difference between the vehicle body speed and the control vehicle speed V.

Advantages of this embodiment will be described below.
(1-1) The vehicle speed calculating unit 200 according to this embodiment does not need to employ a method of performing a filtering process at the time of acquisition of the control vehicle speed V as a method of reducing the difference between the vehicle body speed and the control vehicle speed V. In this case, it is possible to achieve both of reducing the difference between the vehicle body speed and the control vehicle speed V and curbing a decrease in ability to follow the change of the control vehicle speed V in various kinds of control in the vehicle using the control vehicle speed V.

(1-2) The first vehicle speed calculating unit 201 is configured to extract the wheel speed with the third largest magnitude out of the wheel speeds of four wheels. Accordingly, even when there is a wheel in the slip state out of some wheels, a wheel speed acquired from a wheel that is not in the slip state can be actively considered in calculating the control vehicle speed V. This is effective for reducing the difference between the vehicle body speed and the control vehicle speed V.

(1-3) The second vehicle speed calculating unit 202 is configured to extract wheel speeds of the rear-right and rear-left wheels out of four wheels. Accordingly, even when there is a wheel in the locked state out of some wheels, a wheel speed acquired from a wheel that is not in the locked state can be actively considered in calculating the control vehicle speed V. This is effective for reducing the difference between the vehicle body speed and the control vehicle speed V.

(1-4) The vehicle speed calculating unit 200 is configured to calculate the control vehicle speed V by summing the first vehicle speed V1 acquired by the first vehicle speed calculating unit 201 and the second vehicle speed V2 acquired by the second vehicle speed calculating unit 202 at distribution proportions. Accordingly, the control vehicle speed V can be calculated based on the first vehicle speed V1 when there is assumed to be a wheel in the slip state, and the control vehicle speed V can be calculated based on the second vehicle speed V2 when there is assumed to be a wheel in the locked state. Accordingly, it is possible to effectively reduce the difference between the vehicle body speed and the control vehicle speed V.

(1-5) The likelihood that there is a wheel in the slip state or the locked state changes depending on whether the vehicle is in the decelerating state, and the vehicle speed calculating unit 200 is configured to change the distribution proportions depending on whether the vehicle is in the decelerating state. When the distribution proportions are actually changed, the control vehicle speed V which is acquired as a result of calculation may change suddenly between before and after the change of the distribution proportions. Therefore, the vehicle speed calculating unit 200 employs the configuration in which the gradual change processing unit 205 is provided in the vehicle speed distribution proportion calculating unit 203. In this case, even when the distribution proportions are changed, it is possible to curb sudden change of the vehicle speed acquired as the result of calculation between before and after the change.

(1-6) The vehicle speed calculating unit 200 according to this embodiment is realized as a function of the steering control device 1 configured to control the operation of the steering system 2 using the control vehicle speed V. In this case, it is possible to achieve both of reducing the difference between the vehicle body speed and the control vehicle speed V and curbing a decrease in ability to follow the change of the control vehicle speed V in various kinds of control in the steering control device 1 using the control vehicle speed V.

Second Embodiment

A vehicle speed calculating device and a control device for a vehicle according to a second embodiment will be described below with reference to the accompanying drawings. Differences from the first embodiment will be mainly described below. The same elements as in the first embodiment will be referred to by the same reference signs and repeated description thereof will be omitted.

In this embodiment, information indicating validity of each of the wheel speeds Vfl, Vfr, Vrl, and Vrr, that is, information indicating whether each of the wheel speeds Vfl, Vfr, Vrl, and Vrr is abnormal, is added. For example, when the wheel speeds Vfl, Vfr, Vrl, and Vrr are output to the steering control device 1, the brake control device 45 outputs an abnormality signal Se as information indicating what value is abnormal when there is an abnormal value. In this case, the brake control device 45 generates the abnormality signal Se when any of the wheel speed sensors 47*l*, 47*r*, 48*l*, and 48*r* has a value which is not possible through comparison with a previous value. Determining whether each of the wheel speeds Vfl, Vfr, Vrl, and Vrr is abnormal may be realized as a function of the vehicle speed calculating unit 200. In this case, the configuration associated with the abnormality signal Se can be deleted.

First Vehicle Speed Calculating Unit 201

Figure 10:
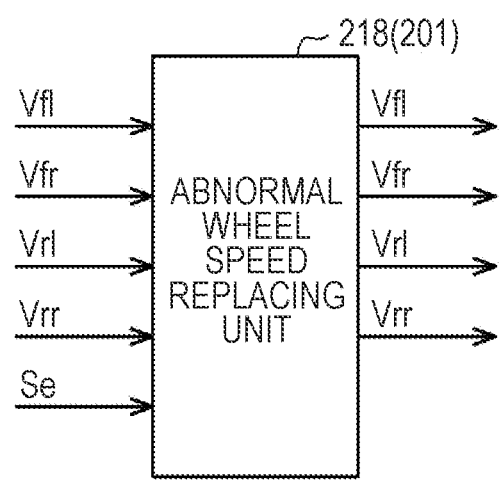
FIG. 10 is a block diagram illustrating functions of an abnormal wheel speed replacing unit in a first vehicle speed calculating unit of a vehicle speed calculating unit according to a second embodiment.

Specifically, as illustrated in FIG. 10, the first vehicle speed calculating unit 201 includes an abnormal wheel speed replacing unit 218 in addition to the configuration described above in the first embodiment.

The wheel speeds Vfl, Vfr, Vrl, and Vrr and the abnormality signal Se are input to the abnormal wheel speed replacing unit 218. When the abnormality signal Se indicating that any of the wheel speeds Vfl, Vfr, Vrl, and Vrr is abnormal is input, the abnormal wheel speed replacing unit 218 performs a replacement process of replacing the abnormal wheel speed with a predetermined fixed value Re. The fixed value Re is set to a negative value of a maximum value of which the absolute value is the largest in a wheel speed range. That is, the fixed value Re represents a value smaller than any other wheel speed, that is, a minimum value out of the wheel speeds of four wheels. In this case, the abnormal wheel speed replacing unit 218 outputs the fixed value Re for the abnormal wheel speed based on the abnormality signal Se, to the first maximum value calculating unit 211, the second maximum value calculating unit 212, the first minimum value calculating unit 213, and the second minimum value calculating unit 214.

For example, when a wheel speed which is abnormal is the wheel speed Vrr of the rear-right wheel based on the abnormality signal Se, the abnormal wheel speed replacing unit 218 outputs the fixed value Re as the value of the rear wheel speed Vrr, to the first maximum value calculating unit 211, the second maximum value calculating unit 212, the first minimum value calculating unit 213, and the second minimum value calculating unit 214. In this case, the second maximum value calculating unit 212 is prevented from calculating, as the rear-wheel maximum value Vrmax, the rear wheel speed Vrr that is the fixed value Re that is a minimum value out of the wheel speeds of four wheels. On the other hand, the second minimum value calculating unit 214 calculates, as the rear-wheel minimum value Vrmin, the rear wheel speed Vrr that is the fixed value Re that is a minimum value out of the wheel speeds of four wheels. Here, the third maximum value calculating unit 216 is prevented from calculating, as the second wheel mid value Vmid2, the rear-wheel minimum value Vrmin that is the rear wheel speed Vrr.

According to this embodiment, operations and advantages similar to those in the first embodiment are achieved. According to this embodiment, the following advantages are additionally achieved. (2-1) The first vehicle speed calculating unit 201 is prevented from reflecting the wheel speed which is abnormal based on the abnormality signal Se in the first vehicle speed V1. This is effective for reducing the difference between the vehicle body speed and the control vehicle speed V.

(2-2) In this embodiment, the second vehicle speed calculating unit 202 may be configured to realize the same function as the function of the abnormal wheel speed replacing unit 218. For example, the rear wheel speeds Vrl and Vrr and the abnormality signal Se are input to the second vehicle speed calculating unit 202. In this case, the second vehicle speed calculating unit 202 may be configured to replace the average value of the rear wheel speeds Vrl and Vrr with an average value of the values of the wheel speeds other than the wheel speed which is abnormal based on the abnormality signal Se. Accordingly, the second vehicle speed calculating unit 202 is prevented from reflecting the wheel speed which is abnormal based on the abnormality signal Se in the second vehicle speed V2.

The aforementioned embodiments may be modified as follows. The following embodiments may be combined together unless technical conflicts arise. In the aforementioned embodiments, the stop lamp signal S input to the vehicle speed calculating unit 200 can be appropriately replaced with a state variable as long as it has a correlation with the decelerating state of the vehicle. Examples of the state variable include a rate of change ΔV in speed of the vehicle. The rate of change ΔV in speed of the vehicle is acquired by differentiating the control vehicle speed V calculated up to the previous calculation cycle. Examples of the state variable include a longitudinal acceleration Cx and a vertical acceleration Cz which are generated in the vehicle. As indicated by an alternate long and two short dashes line in FIG. 1, the longitudinal acceleration Cx and the vertical acceleration Cz are acquired as a result of detection from an acceleration sensor 230 such as a gyro sensor provided in the vehicle. Examples of the state variable include longitudinal loads Fxl and Fxr, vertical loads Fzl and Fzr, pitch moments MFyl and MFyr, and roll moments MFzl and MFzr which are calculated based on forces acting on the turning wheels 5R and 5L. As indicated by an alternate long and two short dashes line in FIG. 1, the longitudinal loads Fxl and Fxr, the vertical loads Fzl and Fzr, the pitch moments MFyl and MFyr, and the roll moments MFzl and MFzr are acquired as a result of detection from a front-left tyre force sensor 231*l* and a front-right tyre force sensor 231*r* which are realized as one function of a sensor hub corresponding to the turning wheels 5R and 5L. The same applies to longitudinal loads Rxl and Rxr, vertical loads Rzl and Rzr, pitch moments MRyl and MRyr, and roll moments MRzl and MRzr which are forces acting on the rear-right and rear-left wheels. As indicated by an alternate long and two short dashes line in FIG. 1, the longitudinal loads Rxl and Rxr, the vertical loads Rzl and Rzr, the pitch moments MRyl and MRyr, and the roll moments MRzl and MRzr are acquired as a result of detection from a rear-left tyre force sensor 232*l* and a rear-right tyre force sensor 232*r* which are realized as one function of a sensor hub corresponding to the rear-right and rear-left wheels. Examples of the state variable include an operation signal Sb of a brake pedal Bp mounted in the vehicle or a brake pressure Pb. As indicted by a solid line in FIG. 1, the operation signal Sb or the brake pressure Pb is acquired from information varying in association with the operation of the brake pedal Bp. It is possible to determine whether the vehicle is in the decelerating state using the various state variables.

In the aforementioned embodiments, the vehicle speed calculating unit 200 may have a function of determining whether the vehicle is in the accelerating state, that is, whether the vehicle is being driven, instead of the function of determining whether the vehicle is in the decelerating state. In this case, for example, an operation signal Sa of an accelerator pedal Ap mounted in the vehicle or an accelerator operation amount Oa may be input to the vehicle speed calculating unit 200, that is, the vehicle speed gain calculating unit 204, instead of the stop lamp signal S. As indicated by an alternate long and two short dashes line in FIG. 1, the operation signal Sa or the accelerator operation amount Oa is acquired from information varying in association with the accelerator pedal Ap. For example, the vehicle speed gain calculating unit 204 may calculate the basic vehicle speed distribution gain Dv2*b* of "zero" when a value indicted by the operation signal Sa or the accelerator operation amount Oa indicates that the vehicle is in the accelerating state. The vehicle speed gain calculating unit 204 may calculate the basic vehicle speed distribution gain Dv2*b* of "1 (100%)" when the value indicted by the operation signal Sa or the accelerator operation amount Oa indicates that the vehicle is in a state including the decelerating state instead of the accelerating state. In this embodiment, the operation signal Sa or the accelerator operation amount Oa can be appropriately replaced with a state variable having a correlation with the accelerating state of the vehicle. Examples of the state variable include a rate of change ΔV of the control vehicle speed V of the vehicle. Examples of the state variable include the longitudinal acceleration Cx and the vertical acceleration Cz which are generated in the vehicle. Examples of the state variable include the longitudinal loads Fxl and Fxr, the vertical loads Fzl and Fzr, the pitch moments MFyl and MFyr, and the roll moments MFzl and MFzr which are calculated based on forces acting on the turning wheels 5R and 5L. The same applies to the longitudinal loads Rxl and Rxr, the vertical loads Rzl and Rzr, the pitch moments MRyl and MRyr, and the roll moments MRzl and MRzr which are forces acting on the rear-right and rear-left wheels. Examples of the state variable include a difference between an output speed Vtm of a transmission TM mounted in the vehicle and a wheel speed acquired based on the rear wheel speeds Vrl and Vrr. As indicated by an alternate long and two short dashes line in FIG. 1, the output speed Vtm is acquired from information varying in association with the operation of the transmission TM mounted in the vehicle such that power for causing the vehicle to travel is transmitted to the rear-right and rear-left wheels which are driving wheels. It is possible to determine whether the vehicle is in the accelerating state using the various state variables. The vehicle speed calculating unit 200 according to this embodiment may have a function of determining whether the vehicle is in the decelerating state, which has been described above in the aforementioned embodiments or the like, in addition to the function of determining whether the vehicle is in the accelerating state.

In the aforementioned embodiments, for example, the brake control device 45 may perform control for changing a yaw rate Y generated in the vehicle regardless of the state of the steering mechanism 4, that is, regardless of a driver's steering, as the control based on the control vehicle speed V. For example, the control vehicle speed V acquired by the function of the vehicle speed calculating unit 200 of the steering control device 1 may be input to the brake control device 45. In this embodiment, the brake control device 45 corresponds to a control device for a vehicle. The brake device corresponds to an onboard device. The control based on the control vehicle speed V may be control for a rear wheel turning device that turns the rear-right and rear-left wheels. In this case, the rear wheel turning device corresponds to an onboard device.

In the aforementioned embodiments, the brake control device 45 may be configured to have the function of the vehicle speed calculating unit 200. In this case, the function of the vehicle speed calculating unit 200 may be deleted from the steering control device 1, and the control vehicle speed V may be input via the brake control device 45. In this embodiment, the brake control device 45 corresponds to a vehicle speed calculating device.

In the aforementioned embodiments, the function of the vehicle speed calculating unit 200 may be realized as a function of the steering-side control unit 50. When the function of the vehicle speed calculating unit 200 is realized as a function of the steering control device 1, the function may be realized as a function of a control unit other than the control units 50 and 60. The function of the vehicle speed calculating unit 200 may be realized as a function of a control device other than the steering control device 1 and the brake control device 45.

In the aforementioned embodiments, the function of the gradual change processing unit 205 may be deleted from the vehicle speed calculating unit 200. In this case, the vehicle speed calculating unit 200 may be configured to calculate one of the first vehicle speed V1 and the second vehicle speed V2 as the control vehicle speed V according to the stop lamp signal S. Accordingly, the function of the vehicle speed gain calculating unit 204 along with the function of the gradual change processing unit 205 can be deleted from the vehicle speed calculating unit 200.

In the first embodiment, the first vehicle speed calculating unit 201 may extract the fourth largest, that is, smallest, wheel speed out of the wheel speeds of four wheels. In this case, the same advantages as (1-1) to (1-6) in the first embodiment can also be achieved.

In the first embodiment, when there is a wheel in the slip state and the wheel in the slip state is assumed to be one wheel, the first vehicle speed calculating unit 201 may extract the second largest wheel speed out of the wheel speeds of four wheels. In this case, the first vehicle speed calculating unit 201 may be configured to include a maximum value calculating unit that extracts the larger value of the wheel-speed mid values Vmid1 and Vmid2 as the first vehicle speed V1, instead of the fourth minimum value calculating unit 217.

In the aforementioned embodiments, the second vehicle speed calculating unit 202 may calculate one of the rear wheel speeds Vrl and Vrr as the second vehicle speed V2, instead of the average value of the rear wheel speeds Vrl and Vrr.

In the first embodiment, the vehicle speed calculating unit 200 has at least one function of the first vehicle speed calculating unit 201 and the second vehicle speed calculating unit 202. For example, the second vehicle speed calculating unit 202 may be deleted from the vehicle speed calculating unit 200, and the first vehicle speed V1 may be calculated as the control vehicle speed V. In this case, at least active reflection of a value acquired from a wheel that is not in the slip state in calculating the control vehicle speed V can be realized. The first vehicle speed calculating unit 201 may be deleted from the vehicle speed calculating unit 200, and the second vehicle speed V2 may be calculated as the control vehicle speed V. In this case, at least active reflection of a value acquired from a wheel that is not in the locked state in calculating the control vehicle speed V can be realized. The same applies to the second embodiment.

In the second embodiment, the fixed value Re can be appropriately replaced with a value as long as it can be prevented from being extracted as the first vehicle speed V1 by the first vehicle speed calculating unit 201. For example, the value which can be prevented from being extracted as the first vehicle speed V1 by the first vehicle speed calculating unit 201 may be a value obtained by simply replacing an actual wheel speed at that time with a negative value, or a zero value.

In the aforementioned embodiments, as long as at least a state variable associated with the operation of the steering wheel 3 is used to calculate the basic control value I1*, the basic control value calculating unit 71 may not use the control vehicle speed V and may use a combination of other elements. The steering torque Th in the aforementioned embodiments may not be used as the state variable associated with the operation of the steering wheel 3.

In the aforementioned embodiments, the steering-side control unit 50 may calculate the target reaction torque Ts* using, as a steering force Tb*, a value calculated by performing torque feedback control for causing the steering torque Th to match a target steering torque calculated based on the steering torque Th and/or the axial force F. In this case, a proportional component, an integral component, and/or a differential component used for the torque feedback control may be changed based on the control vehicle speed V.

In the aforementioned embodiments, the compensation value calculating unit 72 may calculate at least one of the compensation values I2* to I5*. As long as at least the steering angle θs and the steering velocity ωs are used to calculate the return compensation value I2*, the return compensation value calculating unit 81 may not use the control vehicle speed V or the steering torque Th and may use a combination of other elements. As long as at least steering angle θs is used to calculate the hysteresis compensation value I3*, the hysteresis compensation value calculating unit 82 may not use the control vehicle speed V and may use a combination of other elements such as the steering torque Th. In consideration of hysteresis characteristics with respect to the steering velocity ωs, the hysteresis compensation value calculating unit 82 may use the steering velocity ωs instead of the steering angle θs to calculate the hysteresis compensation value I3*. As long as at least the steering velocity ωs is used to calculate the damping compensation value I4*, the damping compensation value calculating unit 83 may not use the control vehicle speed V and may use a combination of other elements such as the steering torque Th. As long as at least the steering acceleration as is used to calculate the inertia compensation value I5*, the inertia compensation value calculating unit 84 may not use the control vehicle speed V and may use a combination of other elements such as the steering torque Th.

In the aforementioned embodiments, as long as at least the target pinion angle θp* is used to calculate the angle axial force Fr, the angle axial force calculating unit 91 may not use the control vehicle speed V and may use a combination of other elements. The angle axial force calculating unit 91 may use the pinion angle θp instead of the target pinion angle θp*.

In the aforementioned embodiments, as long as at least the turning-side actual current value Ib is used to calculate the current axial force Fi, the current axial force calculating unit 92 may use a combination of other elements such as the control vehicle speed V. The current axial force calculating unit 92 may use, instead of the turning-side actual current value Ib, a current command value acquired to cancel out a difference from a current value on the d-q coordinate system acquired by converting the turning-side actual current value Ib based on the rotation angle θb.

In the aforementioned embodiments, the axial force distribution proportion calculating unit 93 may use another element such as the pinion angle θp, the target pinion angle θp*, the steering angle θs, or a turning speed acquired by differentiating the pinion angle θp to calculate the axial force distribution gain Di instead of or in addition to the control vehicle speed V.

In the aforementioned embodiments, the angle axial force calculating unit 91 or the current axial force calculating unit 92 may be deleted from the axial force calculating unit 56. In this case, the axial force distribution proportion calculating unit 93 may be deleted. The angle axial force Fr calculated by the angle axial force calculating unit 91 or the current axial force Fi calculated by the current axial force calculating unit 92 is output to the subtractor 57.

In the aforementioned embodiments, the axial force calculating unit 56 may have a function of calculating an axial force for transmitting the state of the turning mechanism 6 to a driver in addition to the angle axial force calculating unit 91 and the current axial force calculating unit 92. The state of the turning mechanism 6 may be, for example, a state in which a steering limit of the steering wheel 3, that is, a turning limit of the turning wheels 5R and 5L, has been reached. The state of the turning mechanism 6 may be, for example, a state in which a relationship based on a steering angle ratio between the steering state of the steering wheel 3 and the turning state of the turning wheels 5R and 5L deviates (varies).

In the aforementioned embodiments, the steering angle ratio change control unit 62 may calculate the pre-limiting target pinion angle θpb* by performing adjustment of frequency characteristics on the target pinion angle calculated by adding an adjustment value to the steering angle θs. In this case, the adjustment state of the frequency characteristics may change according to the control vehicle speed V.

In the aforementioned embodiments, the steering angle ratio change control unit 62 may change the adjustment value for changing the steering angle ratio according to the yaw rate Y, the lateral acceleration Cy, or the like calculated based on the result of detection from the acceleration sensor 230 in addition to the control vehicle speed V.

In the aforementioned embodiments, the turning-side control unit 60 may include a limit processing unit that performs a limiting process such that a target pinion angular velocity acquired by differentiating the target pinion angle θpb* is limited by a limit value. In this case, the limit processing unit changes the limit value for the target pinion angular velocity according to the control vehicle speed V.

In the aforementioned embodiments, the proportional component calculating unit 111 in the pinion angle feedback control unit 64 may change a relationship of an output to an input of the proportional component calculating unit 111 based on the control vehicle speed V instead of using the proportional gain Kp to change the proportional component Tp based on the control vehicle speed V. The integral component calculating unit 112 may change a relationship of an output to an input of the integral component calculating unit 112 based on the control vehicle speed V instead of using the integral gain Ki to change the integral component Ti based on the control vehicle speed V. The differential component calculating unit 113 may change a relationship of an output to an input of the differential component calculating unit 113 based on the control vehicle speed V instead of using the differential gain Kd to change the differential component Td based on the control vehicle speed V.

In the aforementioned embodiments, the pinion angle feedback control unit 64 performs PID control using the proportional component Tp, the integral component Ti, and the differential component Td as the angle feedback control, but the disclosure is not limited thereto and, for example, PI control may be performed. The execution mode of the pinion angle feedback control unit 64 can be appropriately modified.

In the aforementioned embodiments, the gradual change processing unit 205 may have a function of gradually decreasing the offset value by a value varying according to a vehicle state, instead of gradually decreasing the offset value with the elapse of time. The vehicle state includes, for example, the control vehicle speed V acquired when the vehicle speed distribution gain Dv2 before the vehicle speed distribution gain Dv2 is switched is used, the control vehicle speed V acquired when the vehicle speed distribution gain Dv2 after it is switched is used, and a difference between the control vehicle speeds V between before and after it is switched. The vehicle state includes, for example, a state variable having a correlation with the accelerating-decelerating state of the vehicle. The vehicle state includes, for example, the lateral acceleration Cy in the vehicle acquired as the result of detection from the acceleration sensor 230. The vehicle state includes, for example, lateral loads Fyl and Fyr, roll moments MFzl and MFzr, and yaw moments MFxl and MFxr which are acquired as the result of detection from the front wheel tyre force sensors 231*l* and 231*r*. The same applies to lateral loads Ryl and Ryr, roll moments MRzl and MRzr, and yaw moments MRxl and MRxr which are acquired as the result of detection from the rear wheel tyre force sensors 232*l* and 232*r*. The vehicle state includes, for example, the yaw rate Y calculated based on the result of detection from the acceleration sensor 230. The vehicle state includes, for example, a slip angle SA which is a lateral slip angle of the turning wheels 5R and 5L calculated based on the result of detection from the acceleration sensor 230. It is possible to gradually decrease the offset value by a value varying according to the vehicle state, using the various vehicle states.

In the aforementioned embodiments, the gradual change processing unit 205 may have a function of gradually decreasing the offset value by a value varying according to a steering state, instead of gradually decreasing the offset value with the elapse of time. The steering state includes, for example, the steering angle θs. The steering state includes, for example, a target steering angle which is a target value of the steering angle θs calculated based on the steering torque Th. The steering state includes, for example, an estimated steering angle acquired by estimating the steering angle θs based on the steering angle θs and the steering torque Th. The steering state includes, for example, a driving support control value Ad* for providing an instruction to change the turning angle of the turning wheels 5R and 5L at the time of performing driving support control. As indicated by an alternate long and two short dashes line in FIG. 1, the driving support control value Ad* is acquired from a driving support control device 233 which is provided in the vehicle separately from the steering control device 1. The driving support control device 233 controls the operation of the turning mechanism 6, that is, the steering system 2, such that various kinds of driving support for improving comfortability of the vehicle can be performed. Driving support includes prevention of lane departure of the vehicle, support for emergency avoidance, and alternative driving when the vehicle stops. The steering state includes, for example, the steering velocity ωs, the target steering velocity acquired by differentiating the target steering angle, an estimated steering velocity acquired by differentiating the estimated steering angle, and a rate of change of the driving support control value acquired by differentiating the driving support control value Ad*. The steering state includes, for example, the steering torque Th. The steering state includes, for example, an estimated steering torque acquired by estimating the steering torque Th based on the steering angle θs and the steering torque Th. The steering state includes, for example, a steering torque differential value acquired by differentiating the steering torque Th and an estimated steering torque differential value acquired by differentiating the estimated steering torque. It is possible to gradually decrease the offset value by a value varying according to the steering state, using the various steering states.

In the aforementioned embodiments, the gradual change processing unit 205 may have a function of gradually decreasing the offset value by a value varying according to a turning state, instead of gradually decreasing the offset value with the elapse of time. The turning state includes, for example, the turning angle of the turning wheels 5R and 5L and the pinion angle θp. As indicated by an alternate long and two short dashes line in FIG. 1, the turning angle of the turning wheels 5R and 5L is acquired as a result of detection from a stroke sensor 234 that detects an axial displacement X of the rack shaft 22. The turning state includes, for example, a target pinion angle θp* and an angle acquired in the course of calculating the target pinion angle θp* such as the target pinion angle θpb*. The turning state includes, for example, the driving support control value Ad*. The turning state includes, for example, a pinion angular velocity acquired by differentiating the pinion angle θp, a target pinion angular velocity acquired by differentiating the target pinion angle θp* or the angle acquired in the course of calculating the target pinion angle θp*, and a rate of change of the driving support control value acquired by differentiating the driving support control value Ad*. It is possible to gradually decrease the offset value by a value varying according to the turning state, using the various turning states.

In the aforementioned embodiments, in consideration of a torsion of the steering shaft 11 according to the steering torque Th, the steering angle calculating unit 51 may calculate the steering angle θs by reflecting the torsion in the rotation angle θa by addition/subtraction of the torsion.

In the aforementioned embodiments, a result of detection from a steering sensor may be used as the steering angle θs, the steering sensor being provided in the steering shaft 11 such that the rotation angle of the steering shaft 11 can be detected. In the aforementioned embodiments, the turning-side motor 32 may employ, for example, a configuration in which the turning-side motor 32 is arranged coaxially with the rack shaft 22 or a configuration in which the turning-side motor 32 is connected to the pinion shaft via a worm and wheel, the pinion shaft and the rack shaft 22 constituting the rack and pinion mechanism.

In the aforementioned embodiments, the steering control device 1 can be configured as a processing circuit including (1) one or more processors that operate in accordance with a computer program (software), (2) one or more dedicated hardware circuits such as an application-specific integrated circuit (ASIC) that performs at least some of various processes, or (3) a combination thereof. The processor includes a CPU and memories such as a RAM and a ROM, and the memories store program codes or commands configured to cause the CPU to perform processing. Memories, that is, non-transitory computer-readable media, include all available media that can be accessed by a general-purpose or dedicated computer. The same applies to the brake control device 45.

In the aforementioned embodiments, the steering system 2 employs a linkless structure in which the steering mechanism 4 and the turning mechanism 6 are normally mechanically disconnected from each other, but the disclosure is not limited thereto and the steering system may employ a structure in which the steering mechanism 4 and the turning mechanism 6 can be mechanically disconnected by a clutch. The steering system 2 may be an electric power steering system that applies an assist force which is a force for assisting a driver's steering. In this case, the steering wheel 3 is mechanically connected to the pinion shaft 21 via the steering shaft 11.

The vehicle in which the steering system 2 according to the aforementioned embodiments is mounted may employ a so-called FF system in which a drive torque for rotationally driving the right and left front wheels is generated by a drive source mounted on the front side of the vehicle. In this case, the right and left front wheels are driving wheels. The vehicle in which the steering system 2 is mounted may employ a so-called four-wheel-drive system in which drive torques for individually rotationally driving four wheels are generated using power generated by the drive source mounted on the front side of the vehicle. In this case, each of the four wheels is a driving wheel. In the vehicle in which the steering system 2 is mounted, a position at which a drive source for generating a drive torque is mounted, such as the rear side or the center in a longitudinal direction of the vehicle, is not particularly limited.

What is claimed is:

1. A vehicle speed calculating device comprising:
   a vehicle speed calculating unit configured to calculate a control vehicle speed that is acquired by estimating a vehicle body speed that is a speed at which a vehicle is actually traveling, as a state variable that is used to control an onboard device configured to operate to realize various functions provided in the vehicle,
   wherein the vehicle speed calculating unit is configured to include:
      an extraction function of extracting at least one wheel speed acquired from a wheel having wheel speed with a third largest magnitude amongst four wheels, the wheel being assumed to be rotating in a state in which an influence causing a difference from the vehicle body speed is likely to be small; and
      a calculation function of calculating the control vehicle speed based on the at least one wheel speed extracted by the extraction function.

2. The vehicle speed calculating device according to claim 1, wherein the extraction function is configured to extract at least one wheel speed of at least one wheel that is determined in design of the vehicle to be less likely to fall into a locked state, the locked state of each of the plurality of wheels being a state in which the wheel does not rotate relative to a ground contact surface even when the vehicle is traveling.

3. The vehicle speed calculating device according to claim 2, wherein the extraction function includes a first extraction function of extracting the at least one wheel speed that is classified as the at least one small value when the values of the plurality of wheel speeds are classified according to the magnitudes thereof and a second extraction function of extracting the at least one wheel speed of the at least one wheel that is determined in the design of the vehicle to be less likely to fall into the locked state, and
   wherein the vehicle speed calculating unit is configured to calculate the control vehicle speed based on at least one of a first vehicle speed that is acquired based on the at least one wheel speed extracted by the first extraction function and a second vehicle speed that is acquired based on the at least one wheel speed extracted by the second extraction function.

4. The vehicle speed calculating device according to claim 3, wherein the vehicle speed calculating unit is configured to further include a vehicle speed distributing function of summing a plurality of vehicle speeds including the first vehicle speed acquired by the first extraction function and the second vehicle speed acquired by the second extraction function at predetermined distribution proportions, and
   wherein the vehicle speed distributing function includes a function of changing the distribution proportions according to an accelerating-decelerating state of the vehicle and a function of gradually changing the distribution proportions at a time of changing the distribution proportions.

5. A control device for a vehicle, the control device comprising the vehicle speed calculating device according to claim 1, wherein the control device is configured to control an operation of the onboard device using the control vehicle speed acquired by the vehicle speed calculating device.

* * * * *